United States Patent
Radin

(10) Patent No.: US 10,800,267 B2
(45) Date of Patent: Oct. 13, 2020

(54) CONTACT CHARGING SYSTEM FOR VEHICLE-MOUNTED BATTERIES

(75) Inventor: Lon B. Radin, Palo Alto, CA (US)

(73) Assignee: Media Cart Holdings, Inc., Plano, TX (US)

( * ) Notice: Subject to any disclaimer, the term of this patent is extended or adjusted under 35 U.S.C. 154(b) by 570 days.

(21) Appl. No.: 13/984,164

(22) PCT Filed: Feb. 7, 2012

(86) PCT No.: PCT/US2012/024199
§ 371 (c)(1),
(2), (4) Date: Aug. 7, 2013

(87) PCT Pub. No.: WO2012/109283
PCT Pub. Date: Aug. 16, 2012

(65) Prior Publication Data
US 2013/0335023 A1      Dec. 19, 2013

Related U.S. Application Data

(60) Provisional application No. 61/440,144, filed on Feb. 7, 2011.

(51) Int. Cl.
*B60L 53/14*      (2019.01)
*B60L 11/18*      (2006.01)
(Continued)

(52) U.S. Cl.
CPC ........... *B60L 11/1838* (2013.01); *B60L 53/14* (2019.02); *B60L 53/60* (2019.02); *B60L 2200/12* (2013.01);
(Continued)

(58) Field of Classification Search
CPC ...... B60L 11/1838; B60L 53/14; B60L 53/60; B60L 2200/12; B60L 2240/549;
(Continued)

(56) References Cited

U.S. PATENT DOCUMENTS 5,773,954 A * 6/1998 VanHorn ............... B62B 3/1408
                                                   280/33.991
6,520,303 B1 * 2/2003 Malek ..................... B60M 1/34
                                                   191/22 R
(Continued)

FOREIGN PATENT DOCUMENTS

JP   2000050508 A   2/2000
JP   2005149808 A   6/2005
(Continued)

OTHER PUBLICATIONS

Filing receipt and specification for provisional patent application entitled "Contact charging system for vehicular batteries," by Lon B. Radin, filed Feb. 7, 2011 as U.S. Appl. No. 61/440,144.
(Continued)

*Primary Examiner* — Nha T Nguyen
(74) *Attorney, Agent, or Firm* — Jerry C. Harris, Jr.

(57) ABSTRACT

A system for charging a vehicle-mounted battery comprising a vehicle, a battery, a plurality of electrical contacts, wherein the plurality of electrical contacts is coupled to the vehicle and at least one of the plurality of electrical contacts is electrically connected to the battery, a plurality of electric power transfer components, wherein at least one of the plurality of electric power transfer components rotates about an axis, and wherein each of the plurality of electric power transfer components is configured to prevent undesired connections between the plurality of electric power transfer components and the vehicle, and a power source.

20 Claims, 19 Drawing Sheets

(51) Int. Cl.
*B60L 53/60* (2019.01)
*B62B 5/00* (2006.01)
*B62B 3/14* (2006.01)

(52) U.S. Cl.
CPC ....... *B60L 2200/22* (2013.01); *B60L 2200/30* (2013.01); *B60L 2200/42* (2013.01); *B60L 2240/36* (2013.01); *B60L 2240/549* (2013.01); *B60L 2270/147* (2013.01); *B62B 3/1404* (2013.01); *B62B 5/00* (2013.01); *Y02T 10/7005* (2013.01); *Y02T 10/7072* (2013.01); *Y02T 90/14* (2013.01)

(58) Field of Classification Search
CPC ............ B60L 2200/30; B60L 2240/36; B60L 2200/22; B60L 2270/147; B60L 2200/42; Y02T 10/7005; Y02T 90/14; Y02T 10/7072; B62B 5/00; B62B 3/1404
See application file for complete search history.

(56) References Cited

U.S. PATENT DOCUMENTS

| | | | |
|---|---|---|---|
| 7,741,808 B2 | 6/2010 | Fowler et al. | |
| 7,782,194 B2 | 8/2010 | Stawar et al. | |
| 2010/0013436 A1* | 1/2010 | Lowenthal | G06Q 30/04 320/109 |
| 2010/0039067 A1* | 2/2010 | Hill | B60L 5/42 320/109 |
| 2010/0315040 A1* | 12/2010 | Sakurai | B60L 11/1811 320/109 |
| 2011/0148350 A1* | 6/2011 | Wegener | B60L 11/182 320/108 |

FOREIGN PATENT DOCUMENTS

| | | |
|---|---|---|
| WO | 2012109283 A2 | 8/2012 |
| WO | 2012109283 A3 | 8/2012 |
| WO | 2012109283 A9 | 8/2012 |

OTHER PUBLICATIONS

Foreign communication from a related counterpart application—International Search Report and Written Opinion, PCT/US2012/024199, dated Aug. 31, 2012, 10 pages.

Foreign communication from a related counterpart application—International Preliminary Report on Patentability, PCT/US2012/024199, dated Aug. 13, 2013, 7 pages.

* cited by examiner

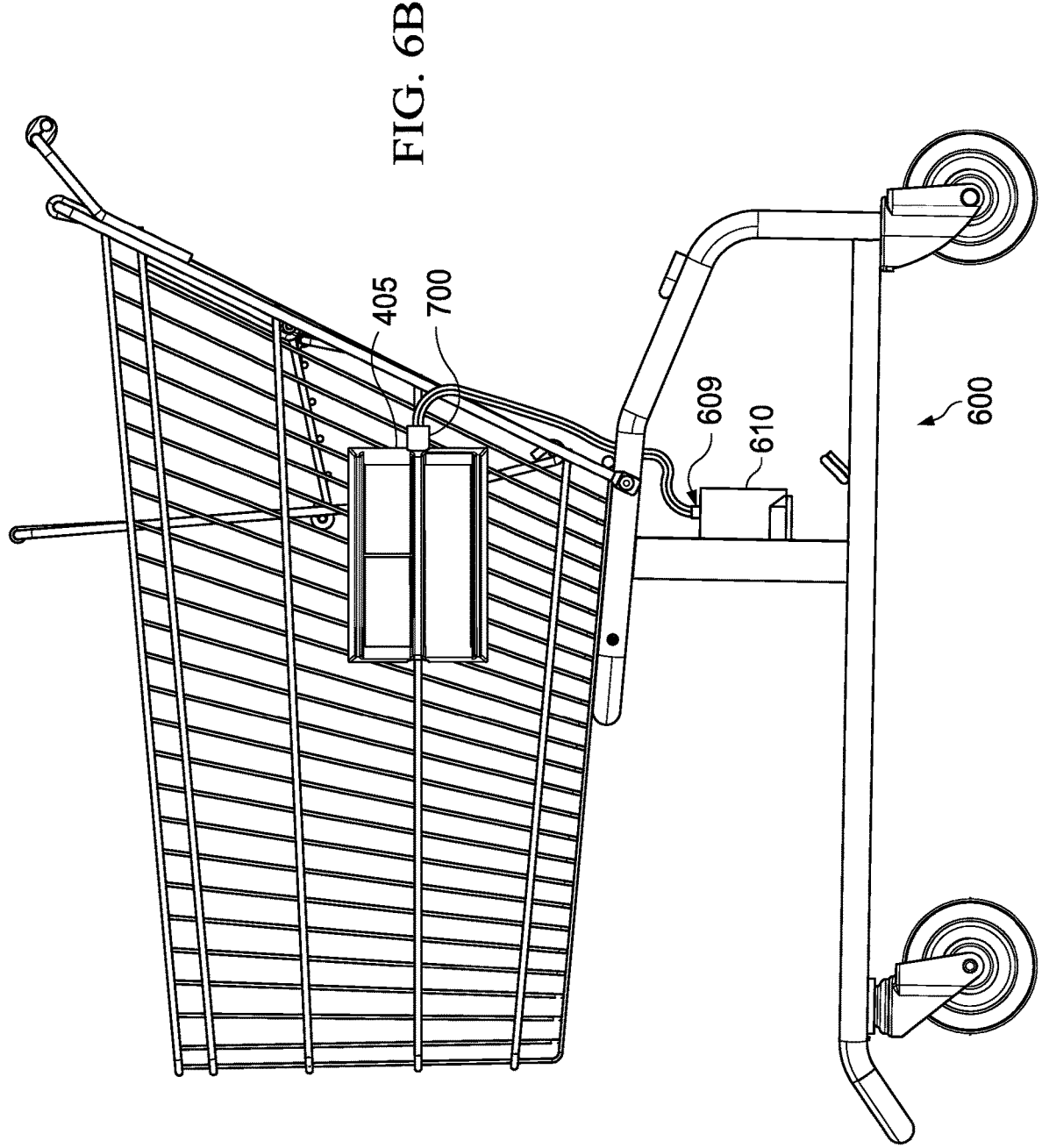

CONTACT CHARGING SYSTEM FOR VEHICLE-MOUNTED BATTERIES

CROSS-REFERENCE TO RELATED APPLICATIONS

This application is a filing under 35 U.S.C. 371 of International Application No. PCT/US2012/024199 filed Feb. 7, 2012, entitled "Contact Charging System for Vehicle-Mounted Batteries," which claims priority to U.S. Provisional Patent Application No. 61/440,144 filed on Feb. 7, 2011, which applications are incorporated by reference herein in their entirety.

FIELD OF THE INVENTION

The present disclosure is directed to a contact charging system for vehicle-mounted batteries, and more particularly, but not by way of limitation, to a system for providing an electrical charge to batteries utilized in electrical power consuming vehicles, e.g., shopping carts, strollers, dollies, hand-trucks, golf carts, fork lifts, electric automobiles, scooters, go-carts, battery-powered ride-on toy vehicles, and the like.

BACKGROUND OF THE INVENTION

Battery-powered electronic devices are increasingly being mounted on merchant-provided ambulatory devices for consumer use. Such devices often include shopping carts, strollers, dollies, and hand-trucks. For example, a battery-powered computerized display may be provided on a media enhanced shopping cart to provide information and advertising to shoppers. The batteries used to power such a media enhanced shopping cart require periodic recharging, typically each day.

As is generally understood, the grocery environment presents numerous challenges to those who try to maximize operating revenues. For example, marketable space is at a premium so devices and systems used in that space need to promote sales and occupy as little of that space as possible. Another example of the challenges facing grocery-type establishments is the environment itself, e.g., rain, snow, heat, humidity, apathy of cart users regarding care of carts, etc., all of which may take a significant toll on ordinary carts and systems.

It has long been a challenge to design charging systems for vehicle-mounted batteries. Manual connection using cables is possible, but is problematic due to the time-consuming, ongoing human intervention required. Various industrial-scale, stand-alone, electrical contact systems exist, typically involving heavy metallic contacts and requiring precise alignment. These systems have bulky, heavy metal contacts that are typically either floor-mounted or mounted overhead. These floor-mounted and over-head mounting locations are often undesirable due to the infrastructure required to implement such bulky and burdensome installations, as well as the dangerous amounts of electrical charge readily accessible by unknowing/unaware interlopers.

Furthermore, while wireless charging systems have been employed for small, electrically-powered devices that require only a modicum of electrical charge to function, e.g., electric toothbrushes and cell phones, it is widely understood that transferring more than a few watts of power over distances of more than an inch is inefficient and expensive, and is generally not safe due to leakage of power into unintended targets.

What is needed is a charging system for vehicle-mounted batteries that operates without human intervention, has neither floor-mounted contacts nor overhead-mounted contacts, may be relocated, is exceptionally rugged, can continue to function in spite of abuse to the carts, and is not dangerous to users, workers, or members of the public.

SUMMARY OF THE INVENTION

Disclosed herein is a system for charging a vehicle-mounted battery comprising a vehicle, a battery, a plurality of electrical contacts, wherein the plurality of electrical contacts is coupled to the vehicle and at least one of the plurality of electrical contacts is electrically connected to the battery, a plurality of electric power transfer components, wherein at least one of the plurality of electric power transfer components rotates about an axis, and wherein each of the plurality of electric power transfer components is configured to prevent undesired connections between the plurality of electric power transfer components and the vehicle, and a power source.

Further disclosed herein is a system for charging a vehicle-mounted battery comprising a vehicle, a battery, a plurality of electrical contacts, wherein the plurality of electrical contacts is coupled to the vehicle and at least one of the plurality of electrical contacts is electrically connected to the battery, a plurality of electric power transfer components, wherein at least one of the plurality of electric is tensioned so that at least one of the plurality of electric power transfer components maintains contact with at least one of the plurality of electrical contacts without utilizing a guide mechanism for the vehicle, and a power source.

Also disclosed herein is a system for charging a vehicle-mounted battery comprising a vehicle, a battery, a plurality of electrical contacts, wherein the plurality of electrical contacts is coupled to the vehicle and at least one of the plurality of electrical contacts is electrically connected to the battery, a plurality of electric power transfer components, wherein at least one of the plurality of electric power transfer components is mounted to a plurality of mechanical constraints, wherein at least one of the plurality of mechanical constraints is associated with a tensioning component, wherein the tensioning component is configured to exert force on the least one of the plurality of electric power transfer components to facilitate maintaining contact between the at least one of the plurality of electric power transfer components and the vehicle, and wherein each of the plurality of electric power transfer components is configured to prevent undesired connections between the plurality of electric power transfer components and the vehicle, and a power source.

Also disclosed herein is a contact for receiving an electric power transfer, wherein the contact comprises a plurality of contacting portions configured to receive electrical power transfer from a plurality of electric power transfer components.

Also disclosed herein is a contact component for transferring electric power, wherein the contact component rotates about an axis, and wherein the contact component is configured to prevent undesired connections between the component and a vehicle which it contacts for electric power transfer.

Also disclosed herein is a contact component for transferring electric power, wherein the contact component is mounted to a plurality of mechanical constraints, wherein at least one of the plurality of mechanical constraints is associated with a tensioning component, wherein the tensioning component is configured to exert force on the contact component to facilitate maintaining contact between the contact component and a vehicle which it contacts for electric power transfer.

Also disclosed herein is a method of charging a vehicle mounted battery comprising providing a vehicle, wherein the vehicle comprises a battery, providing a plurality of electrical contacts, wherein the plurality of electrical contacts is affixed to the vehicle and at least one of the plurality of electrical contacts is electrically connected to the battery, providing a plurality of electric power transfer components, wherein at least one of the plurality of electric power transfer components rotates about an axis and is electrically connected to a power source, allowing for the at least one electric power transfer component and the at least one of the plurality of electrical contacts which is electrically connected to the battery to come into contact, wherein the plurality of electric power transfer components is configured to prevent undesired connections between the plurality of electric power transfer components and the vehicle.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 6B is a perspective view of an embodiment of a shopping cart with a charging contact assembly affixed.

DETAILED DESCRIPTION OF INVENTION

It should be understood at the outset that although certain exemplary implementations of embodiments of the present disclosure is illustrated below, the present system may be implemented using any number of techniques, whether currently known or in existence. The present disclosure should in no way be limited to the exemplary implementations, drawings, and techniques illustrated below, including the exemplary designs and implementations illustrated and described herein.

As will be explained in greater detail below, this disclosure concerns a charging system for supplying electrical power to a vehicle having a mounted/integrated power storage system. The systems described herein generally comprise a base structure having a power source and a plurality of layers of electrical power transfer components, e.g., contact arms. The layers of contact arms generally function to allow only particular contact arms of particular layers to contact certain areas of a vehicle's electrical power receptors, e.g., electrical contacts. The vehicle's electrical contacts are typically connected to the vehicle's power system, e.g., battery, and function to receive electrical power transferred by the system's contact arms. Both the system's contact arms and electrical contacts may be connected to circuitry which determines whether a valid electrical connection has been achieved and whether to proceed with electrical power transfer between the contact arms and the electrical contact. As will be further discussed, the contact arms and electrical contacts may interact as the vehicle brushes against the contact arms. For example, a shopping cart with a rechargeable battery connected to an electrical contact may be positioned, by a consumer or store employee, so as to place the shopping cart's electrical contact (which may be mounted on the side of the cart's basket) in contact the contact arms of the base structure (and associatively in contact with a power source) to facilitate recharging of the shopping cart's battery. Contact between the base structure's contact arms and the cart's electrical contact forms a flow path for electrical current between the power source and the battery such that the battery may be recharged.

Figure 1A:
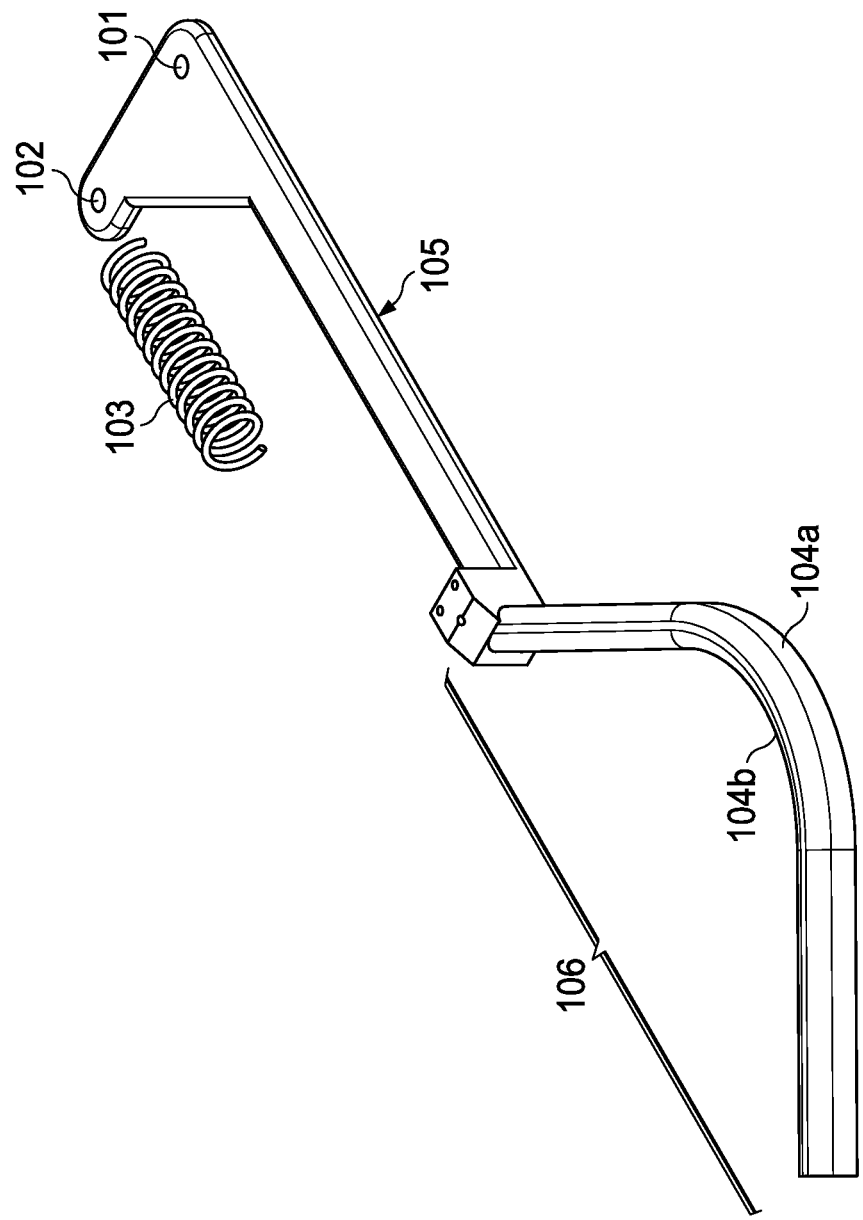
FIG. 1A is a perspective view of an embodiment of a single contact arm.
Figure 2A:
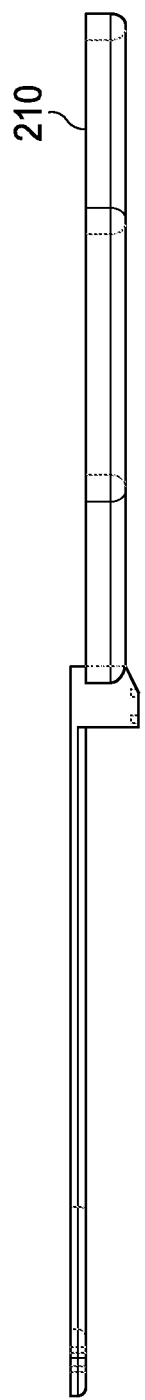
FIG. 2A is a side view of an embodiment of a single contact arm.
Figure 2B:
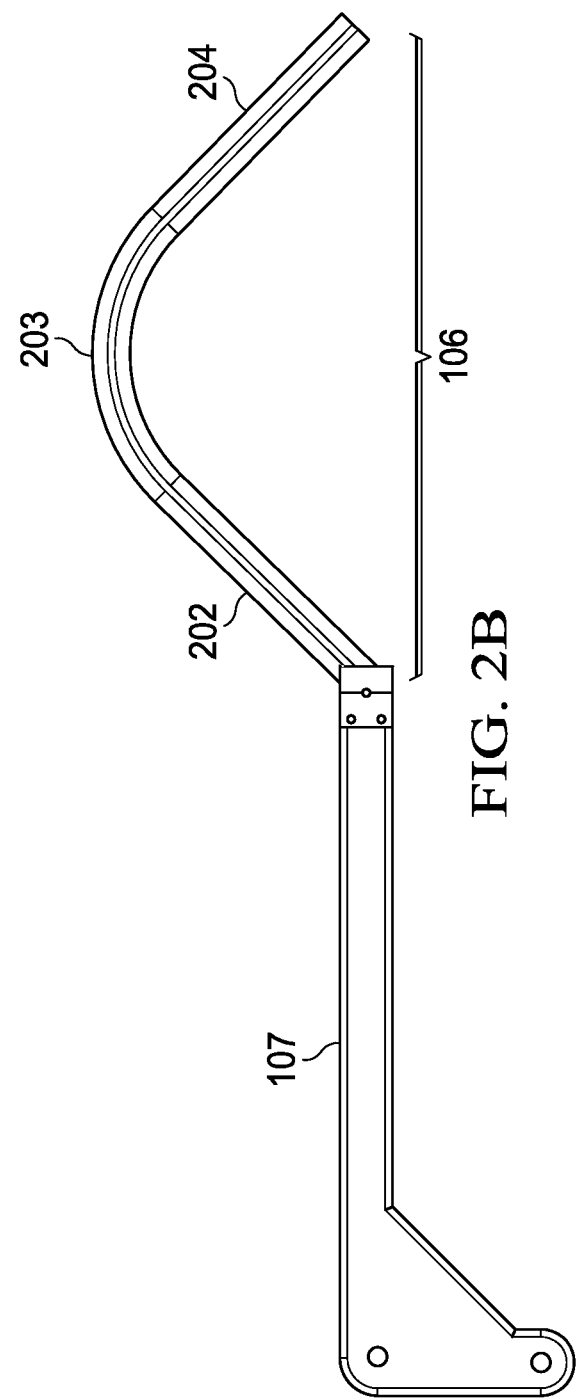
FIG. 2B is a top view of an embodiment of a single contact arm.
Figure 7A:
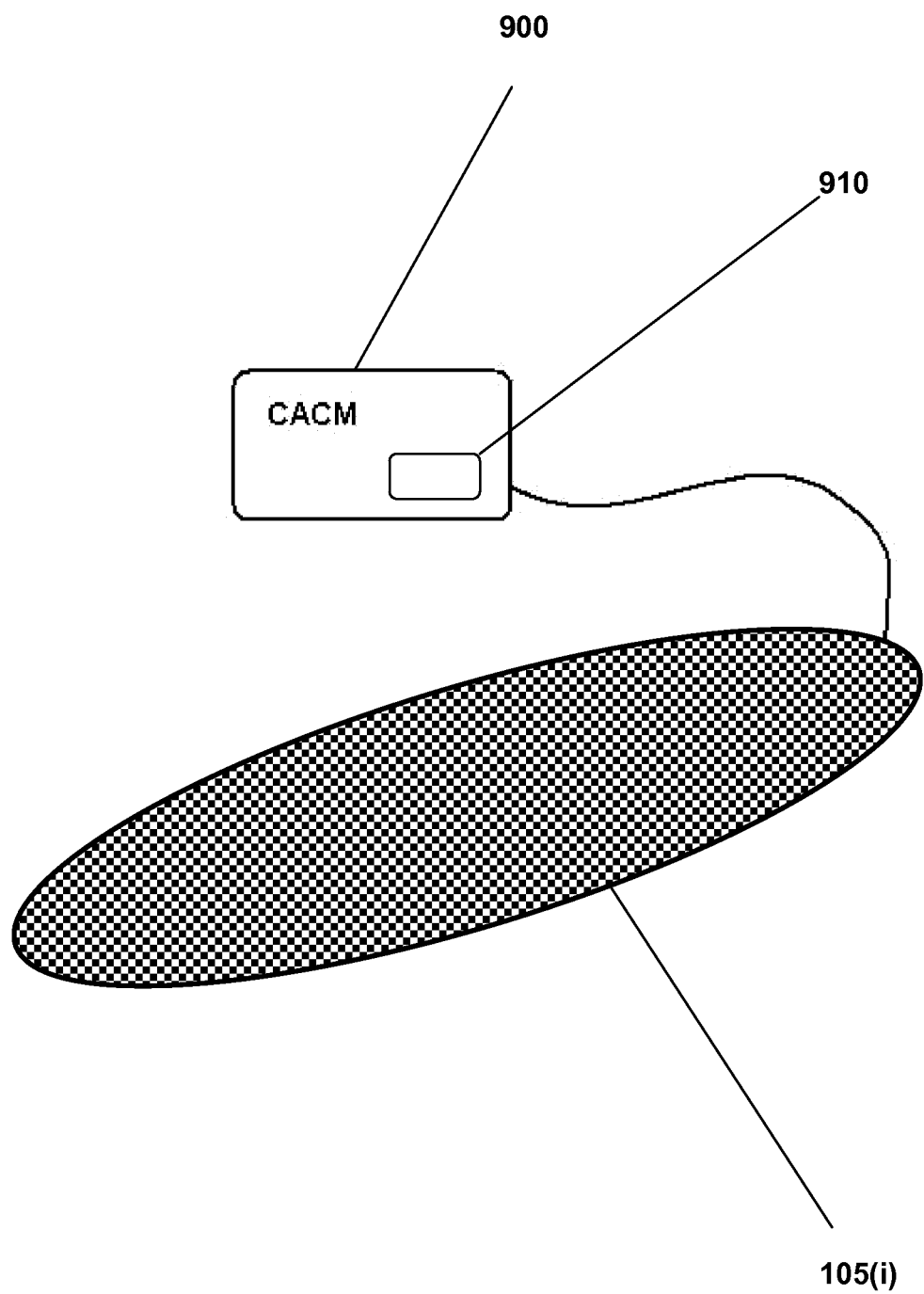
FIG. 7A is a depiction of an embodiment of a single power contact arm connected to a Cart Contact Circuit Module.

FIG. 1A shows a contact component, e.g., an electric power transfer component. In an embodiment an electric power transfer component may comprise a single contact arm 105. The single contact arm 105 may comprise, e.g., be made of, a naturally occurring substance, plastic, metal, composite material, polymeric substance, and/or a combination thereof. As shown in FIG. 1A, area 101 is a portion of the contact arm wherein the contact arm's 105 comprising material is arranged in such a fashion to form a void area in the contact arm 105 where none of the contact arm's 105 comprising material is present, e.g., a hole. Area 101 may be occupied, threaded, and/or penetrated by a bolt, screw, cotter pin, or any other type of fastener and/or projection, or combinations thereof that may function as a fulcrum-like object about which the contact arm 105 may rotate, e.g., rotate about an axis, in a substantially horizontal plane. Area 102 is a portion of the contact arm wherein the contact arm's 105 comprising material is arranged in such a fashion to form a void area in the contact arm 105 where none of the contact arm's 105 comprising material is present, e.g., a hole. In an embodiment, area 102 may be an attachment zone for a tensioning component 103, e.g., a coiled extension spring, an elastic band (made of synthetic or natural materials), a hydraulic piston device, any other component configured for providing a tensioning force, and any combinations thereof, which provides a force to the contact arm 105 that counters, and is substantially the opposite direction (while being in substantially the same horizontal plane), to a force exerted upon the contact arm 105, at or about the location of the contact arm's charging contact area 104*a*. The contact arm's charging contact area 104*a* is located generally at and about the pinnacle area of the contact arm's 105 convexly configured portion, the contact arm's 105 convexly configured portion is typically opposite the contact arm's 105 concavely configured portion 104*b*. The contact arm's charging contact area 104*a* comprises an electrically conductive surface which is curved in at least two dimensions, the electrically conductive surface may comprise a metallic coating or an exposed metallic portion of the contact arm 105 which had been coated in a non-electrically conductive material, e.g., plastic, rubber, polymeric substance, composite material, and/or other insulating-type material. In an embodiment, contact arm's charging contact area 104*a* may comprise any portion of section 202, section 203, and/or section 204, as shown in FIG. 2B. Referring to FIG. 7A, the contact arm's charging contact area 104*a* may be connected to circuitry 900 that detects whether contact has been successfully made between the contact arm's charging contact area 104*a* and charging contact 400 or charging contact assembly 405. Details of the circuitry 900 are discussed more fully with respect to FIGS. 8A and 8B below.

In an embodiment, as generally shown in FIG. 1A, a tensioning component, e.g., extension spring 103, may be affixed to, coupled to, associated with, joined with, and/or otherwise connected to contact arm 105 and/or about area 102. The extension spring 103 may be affixed to, coupled to, associated with, joined with, and/or otherwise connected to contact arm 105 and/or area 102 by establishing a permanent or non-permanent interaction between the tensioning component and contact arm 105 and/or area 102. The permanent or non-permanent interaction may comprise (i) hooking of a portion of the tensioning component into area 102; (ii) securing a portion of the tensioning component to area 102 via weld, solder, adhesive, or any other bonding-type interaction; (iii) securing a portion of the tensioning component to area 102 via bolt, screw, pin, cable, or any other mechanical-type interaction; (iv) securing a portion of the tensioning component to contact arm 105 in the vicinity of area 102 via weld, solder, adhesive, or any other bonding-type interaction; (v) securing a portion of the tensioning component to contact arm 105 in the vicinity of area 102 via bolt, screw, pin, cable, or any other mechanical-type interaction; (vi) or combinations thereof.

Figure 1B:
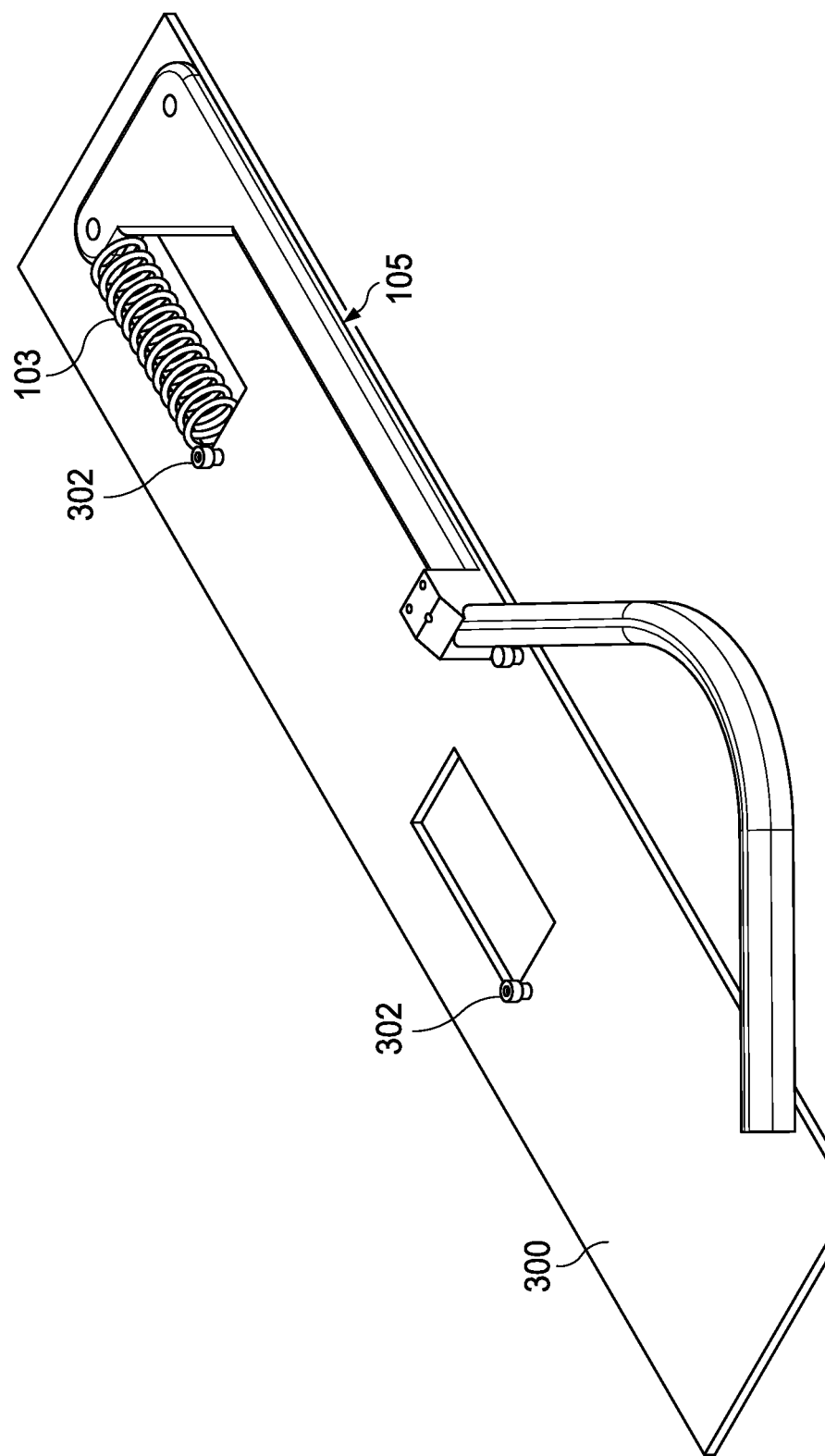
FIG. 1B is a perspective view of an embodiment of a contact arm connected to a contact arm mount.

As shown in FIG. 1B, a tensioning component, e.g., extension spring 103, may also be affixed to, coupled to, associated with, joined with, and/or otherwise connected to a contact arm mount 300. The extension spring 103 may be affixed to, coupled to, associated with, joined with, and/or otherwise connected to contact arm mount 300 and/or area 302 by establishing a permanent or non-permanent interaction between the tensioning component and contact arm mount 300 and/or area 302. The permanent or non-permanent interaction may comprise (i) hooking of a portion of the tensioning component into area 302; (ii) hooking of a portion of the tensioning component onto a protruding portion of area 302; (iii) securing a portion of the tensioning component to area 302 via weld, solder, adhesive, or any other bonding-type interaction; (iv) securing a portion of the tensioning component to area 302 via bolt, screw, pin, cable, or any other mechanical-type interaction; (v) securing a portion of the tensioning component to contact arm mount 300 in the vicinity of area 302 via weld, solder, adhesive, or any other bonding-type interaction; (vi) securing a portion of the tensioning component to contact arm mount 300 in the vicinity of area 302 via bolt, screw, pin, cable, or any other mechanical-type interaction; (vii) or combinations thereof. In an embodiment, area 302 is a post or hole engaged with an end of extension spring 103.

The coupling, connecting, linking, and/or associating of contact arm 105 and contact arm mount 300 can be understood as a contact arm spring mechanism. In alternative embodiments, the contact arm spring mechanism may comprise a spring-loaded scissors linkage and/or a spring-loaded parallelogram linkage.

In an exemplary embodiment, upon exertion of a force upon the contact arm's charging contact area 104*a* (e.g., a force exerted by charging contact 400 or charging contact assembly 405), extension spring 103 lengthens in respect to its original length (i.e., the contact arm's charging contact area's 104*a* non-force applied length). In an embodiment, the extension spring 103 lengthens by percentage of its original length, e.g. from about 0.1% to about 200%, as the contact arm 105 rotates about area 101. In other embodiments an elastic band may stretch by the same percentage of its original length or hydraulic piston device may extend by the same percentage of its original length as the contact arm 105 rotates. In an embodiment, the tensioning component, e.g., extension spring 103, is selected such that the tension force supplied by the tensioning component is sufficient to facilitate constant contact between the contact arm's charging contact area 104*a* and an object comprising charging contact 400 or charging contact assembly 405, while the force supplied by the tensioning component is not enough to cause the object comprising charging contact 400 or charging contact assembly 405 to disengage from a contact or interaction between the contact arm's charging contact area 104*a* and the charging contact 400 or charging contact assembly 405. Thus, in the above embodiment, the contact arm's charging contact area 104*a* and an object comprising charging contact 400 or charging contact assembly 405 may remain in contact without the assistance or utilization of any guide mechanism, slots, rails, bumpers, or other motion inhibitors for an object comprising the charging contact 400 or charging contact assembly 405, e.g., shopping cart 600.

In an embodiment, the tensioning component, e.g., extension spring 103, elastic band, or hydraulic piston device, lengthens only a small percentage, e.g., from about 0.1% to about 25% of its original length as the contact arm 105 rotates about area 101 (similarly an elastic band may stretch by the same small percentage of its original length or hydraulic piston device may extend by the same small percentage of its original length as the contact arm 105 rotates). As a result, the force applied by the contact arm 105 in response to the force upon the contact arm's charging contact area 104*a* stays relatively constant. The consistency of the applied forces is advantageous for the design of the charging contact 400 and the charging contact assembly 405.

The length of contact arm 105 is generally apportioned to a curved contacting portion 106 and a substantially non-curved portion 107 (e.g., a straight or linear portion). The curved contacting portion 106 acts to prevent undesired connections, e.g., snagging and/or catching, between contact arms 105 and vehicles contacting said arms. In an embodiment, the ratio of the curved contacting portion 106 and the substantially non-curved portion 107 is about 1:1. However, in other embodiments the ratio of the curved contacting portion 106 the substantially non-curved portion 107 may be about 1:2, 1:3, 1:4, 2:1, 3:1, or 4:1. As shown in FIGS. 2A and 2B, in an embodiment, contact arm 105 may comprise a length, e.g.: in a range of about 1 in. to about 120 in.; in a range of about 3 in. to 60 in.; in a range of about 6 in. to about 30 in.; or in a range of about 9 in. to about 15 in. (for all discussions of dimensions herein, references to length shall generally mean a relatively longer dimension as depicted in an associated Figure as compared to width which shall generally mean a relatively shorter dimension as depicted in the associated Figure). In an exemplary embodiment, contact arm 105 may comprise a length of, or about, 24 in., wherein the curved contacting portion 106 comprises a length of, or about, 12 in. and the substantially non-curved portion 107 comprises a length of, or about, 12 in.

Contact arm 105 may comprise varied widths along its length. In an embodiment, portions of contact arm 105 may comprise a width, e.g.: in a range of from 0.1 in. to about 36 in.; in a range of about 1 in. to about 18 in.; in a range of about 2 in. to about 9 in.; or in a range of about 3 in. to about 6 in. In an exemplary embodiment, substantially non-curved portion 107 may comprise a width of 0.25 in. and curved contacting portion 106 may comprise a width of 0.5 in. In an exemplary embodiment, contact arm 105 may comprise a uniform width of, or about, 0.5 in.

Figure 1C:
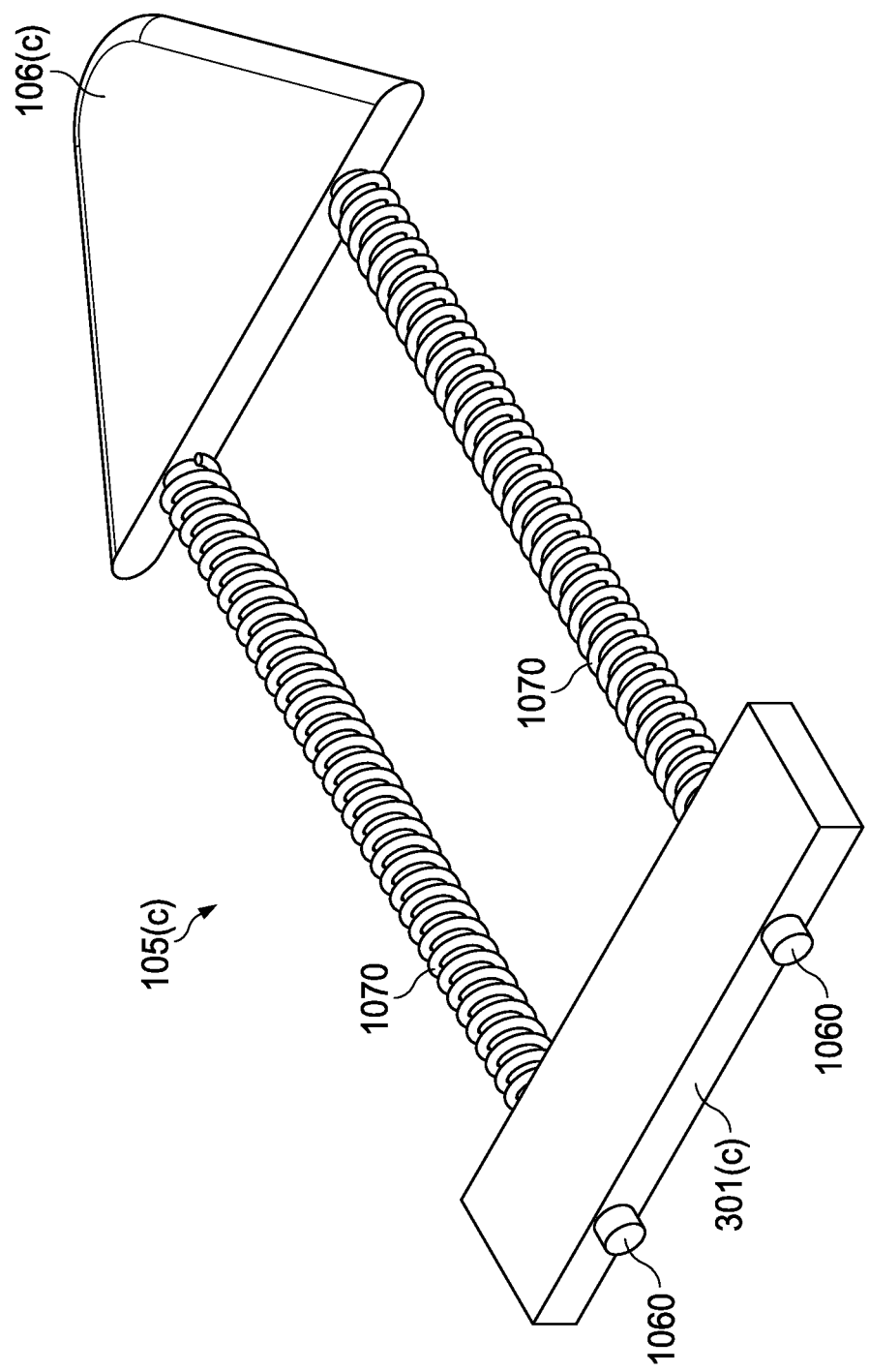
FIGS. 1C and 1D are perspective views of other embodiments of a single contact arm.

As shown in FIG. 1C, in an embodiment, substantially non-curved portion 107 of contact arm 105 is not present and curved contacting portion 106(c) is mounted to a plurality of mechanical constraints, e.g., straight rails 1060. A tensioning component 1070, e.g., a helical compression spring, a bushing, and/or a hydraulic piston device, is associated with at least one of the plurality of straight rails 1060 to exert force on the curved contacting portion 106(c) in a direction away from stabilizing interface 301(c) and toward a contacting vehicle, a contacting charging contact 400 and/or a contacting charging contact assembly 405 to facilitate the maintaining of contact between the curved contacting portion 106(c) and the contacting vehicle, the contacting charging contact 400 and/or the contacting charging contact assembly 405. In an embodiment, the tensioning component 1070 is a helical compression spring which wraps around at least one of the straight rails 1060. Straight rails 1060 may, upon force exerted on curved contacting portion 106(c), move in a direction towards stabilizing interface 301(c) and through openings in stabilizing interface 301(c), while curved contacting portion 106(c) maintains contact with a contacting vehicle, a contacting charging contact 400 and/or a contacting charging contact assembly 405. In an embodiment, straight rails 1060 may, upon force exerted on curved contacting portion 106(c), retract towards stabilizing interface 301(c) due to a telescoping configuration of the straight rails 1060, while curved contacting portion 106(c) maintains contact with a contacting vehicle, a contacting charging contact 400 and/or a contacting charging contact assembly 405. In such an embodiment, the tensioning component 1070 could be wrapped around straight rail 1060 and/or contained within straight rail 1060. In other embodiments additional or alternative mechanical constraints such as thrust bearings, rollers, guide wheels, or slides may be used to ensure the contact arm 105 moves in substantially parallel to straight rails 1060.

Figure 1D:
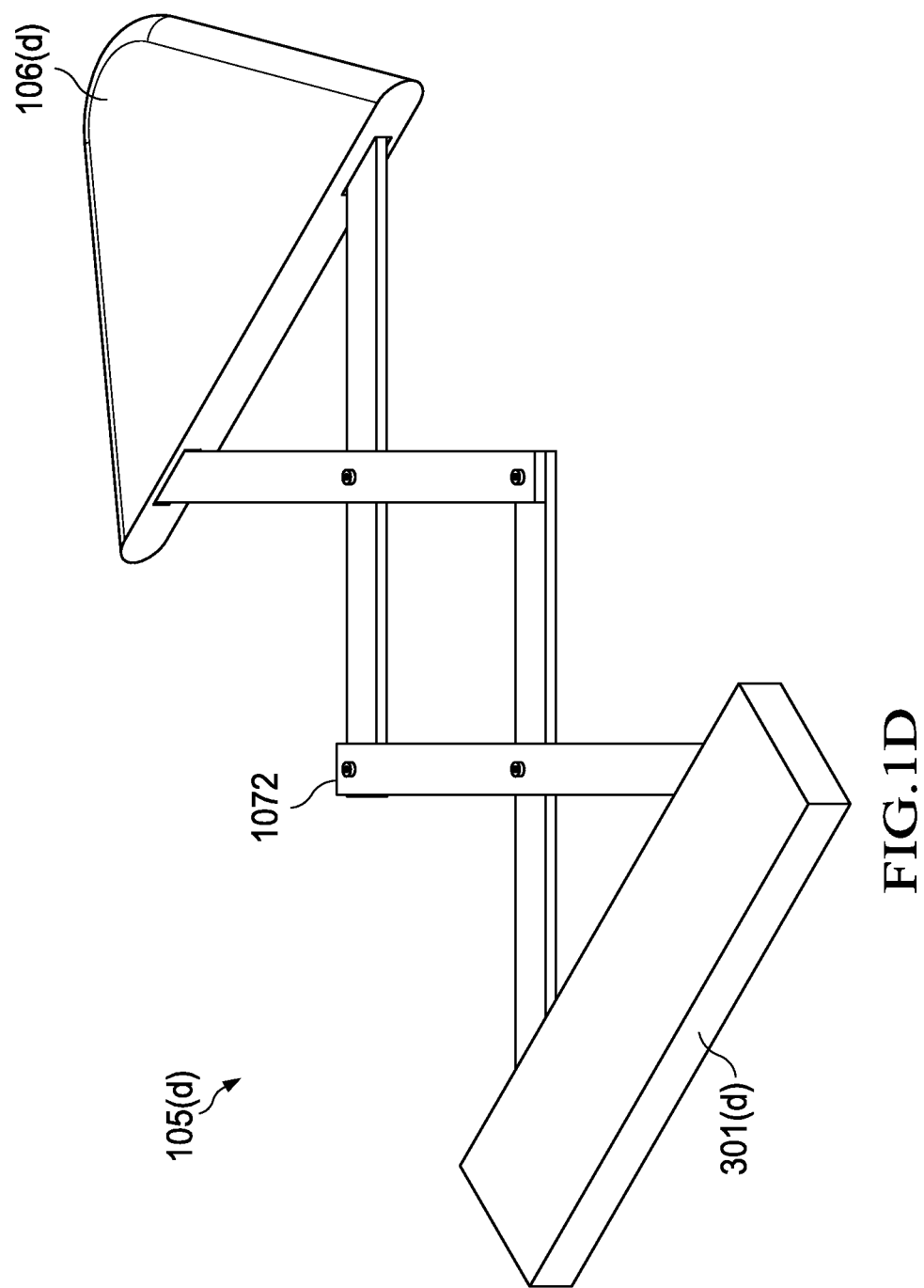

As shown in FIG. 1D, in an embodiment, substantially non-curved portion 107 of contact arm 105 is not present and curved contacting portion 106(d) is mounted to at least one spring-loaded extension linkage 1072, e.g., a spring-loaded scissors linkage or a spring-loaded parallelogram linkage. Spring-loaded extension linkage 1072, e.g., a spring-loaded scissors linkage, exerts force on the curved contacting portion 106(d) in a direction away from stabilizing interface 301(d) and toward a contacting vehicle, a contacting charging contact 400 and/or a contacting charging contact assembly 405 to facilitate the maintaining of contact between the curved contacting portion 106(d) and the contacting vehicle, the contacting charging contact 400 and/or the contacting charging contact assembly 405. In an embodiment, the spring-loaded extension linkage 1072 may, upon force exerted on curved contacting portion 106(d), collapse in a direction towards stabilizing interface 301(d) while curved contacting portion 106(d) maintains contact with a contacting vehicle, a contacting charging contact 400 and/or a contacting charging contact assembly 405.

Figure 3A:
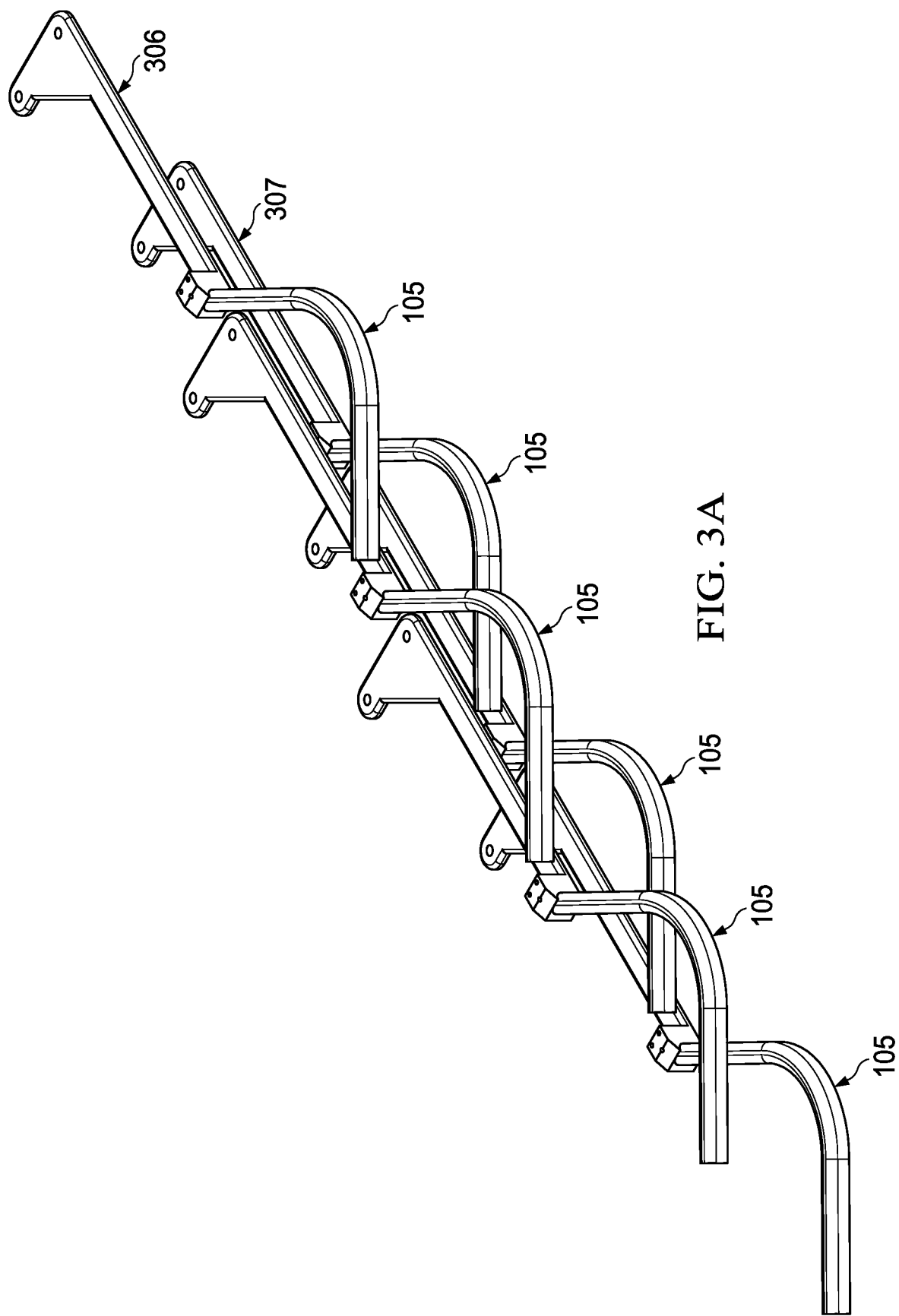
FIG. 3A is a perspective view of an embodiment of six contact arms arranged in two layers.

In an embodiment, the curved contacting portion 106 may be solid, e.g., it may be convex on one side while not concave on the opposite side, or the curved contacting portion 106 may comprise a curved portion, e.g., it may be convex on one side and concave on the opposite side, while also comprising an affixed covering resulting in the curved contacting portion 106 appearing to not comprise a concave presentation. In an embodiment, as depicted in FIG. 3A, the substantially non-curved portion 107 is configured to occupy an area generally below or above the curved contacting portion 106 of another contact arm 105.

FIG. 2A depicts an embodiment of the contact arm 105 as viewed from a vertical perspective, i.e., with the convex portion of the curved contacting portion 106 nearest the observer. In such vertical presentation, the curved contacting portion 106 has a substantially curved cross-section 210. In an embodiment, the radius of curvature for curved cross-section 210 in conjunction with the flexibility (e.g., tensioning) of wire segment 500 allows wire 504 of the charging contact 400 to contact much more of the convex portion of the curved cross-section 210 than would otherwise occur in the absence of the wire segment's 500 flexibility (e.g., absent the flexibility of wire segment 500, the wire 504 may only contact the curved cross-section 210 at one tangential point). In an embodiment, the maximum radius of curvature of wire 504 depends on the wire's 504 diameter (e.g., wire 504 having a $7/64$" diameter may curve with a 0.75" radius of curvature). As such, the pairing convex portion of the curved contacting portion 106 with a wire 504 should be made with consideration given to the possible radius of curvature allowed by the wire's 504 composition and diameter, and in respect to the actual radius of curvature convex portion of the curved contacting portion 106 with which the subject wire 504 will be contacting to ensure maximum contact area.

FIG. 2B depicts an embodiment of the contact arm 105 as viewed from a horizontal perspective, i.e., with the convex portion of the curved contacting portion 106 positioned to the right relative to the substantially non-curved portion 107. In an embodiment, as depicted in FIG. 2B, the curved contacting portion 106 has three sections that join smoothly and seamlessly. Section 202 is substantially linear and at an angle to the substantially non-curved portion 107; the angle is in a range of from greater than about 90 degrees to less than about 180 degrees. In an embodiment, section 202 is substantially linear and at about 135 degrees to the substantially non-curved portion 107. Section 203 is curved and comprises the contact arm's charging contact area 104a, e.g., the area which makes electrical contact with charging contact 400 or charging contact assembly 405. Section 204 is substantially linear and at an angle less than about 90 degrees to the substantially non-curved portion 107. In an embodiment, section 204 is substantially linear and at about 45 degrees to the substantially non-curved portion 107. In another embodiment, section 204 may comprise the shape of a logarithmic spiral, centered at area 101. In an exemplary embodiment of the contact arm 105 depicted in FIG. 2B, when an object comprising a charging contact 400 or charging contact assembly 405 moves from a position that is more near section 204 (comprising the shape of a logarithmic spiral) towards a section 202, the angle of attack the object comprising a charging contact 400 or charging contact assembly 405 with respect to section 203 is constantly about 45 degrees due to mathematical properties of the logarithmic spiral. When an object comprising a charging contact 400 or charging contact assembly 405 moves from a position that is more near section 202 towards a section 204 (comprising the shape of a logarithmic spiral), the angle of attack of the object comprising a charging contact 400 or charging contact assembly 405 with respect to section 203 is consistently about 45 degrees, or less than 45 degrees as the contact arm 105 rotates about area 101. As described, from whichever direction an object comprising a charging contact 400 or charging contact assembly 405 approaches a section 203, the angle of attack against the curved contacting portion 106 will consistently be about 45 degrees or less. This being the case, the resistance felt by the object comprising a charging contact 400 or charging contact assembly 405 is comparable to the spring force of the contact arm 105, as provided via the tensioning component, e.g., extension spring 103. In an embodiment, the spring force of contact arm 105 may be any value within the range of 0.1 ounce to 64.0 ounce. For example, the spring force of contact arm 105 may be about 8.0 ounces.

As noted above, in an embodiment the substantially non-curved portion 107 is configured to occupy an area generally below or above the curved contacting portion 106 of another contact arm 105. FIG. 3A depicts and embodiment wherein six contact arms 105 are positioned two layers of three contact arms 105, wherein a first layer of three contact arms 306 occupy substantially a same plane and a second layer of three contact arms 307 occupy substantially a same plane which differs from the plane occupied by the first layer of three contact arms 105. As reflected in FIG. 3A, in an embodiment, the first layer of three contact arms 306 and the second layer of three contact arms 307 are offset horizontally and overlap. Thus, the contact arms 105 may be positioned closer together horizontally than the width of a charging contact 400 or a charging contact assembly 405 (as will be discussed in more detail herein). As a result, there will always be at least one contact arm 105 contacting a charging contact 400 or charging contact assembly 405; thus, preventing the occurrence of electrical "dead spots."

In such a multiple contact arm 105 arrangement, each contact arm 105 rotates individually about its area 101 and is individually actuated by a dedicated tensioning component, e.g., a dedicated extension spring 103. Furthermore, each of the contact arm's charging contact area 104*a* is individually connected to circuitry that detects whether contact has been successfully made between the contact arm's charging contact area 104*a* and charging contact 400 or charging contact assembly 405. The number of contact arms 105, as well as the number of layers in which said contact arms 105 are divided, are easily varied/modified based upon the particular requirements or preferences of a user. In other words, two contact arms in two layers, 100 contact arms in 10 layers, 1000 contact arms in 2 layers, and all other combinations of multiple contact arms and multiple layers are considered and disclosed.

Figure 3B:
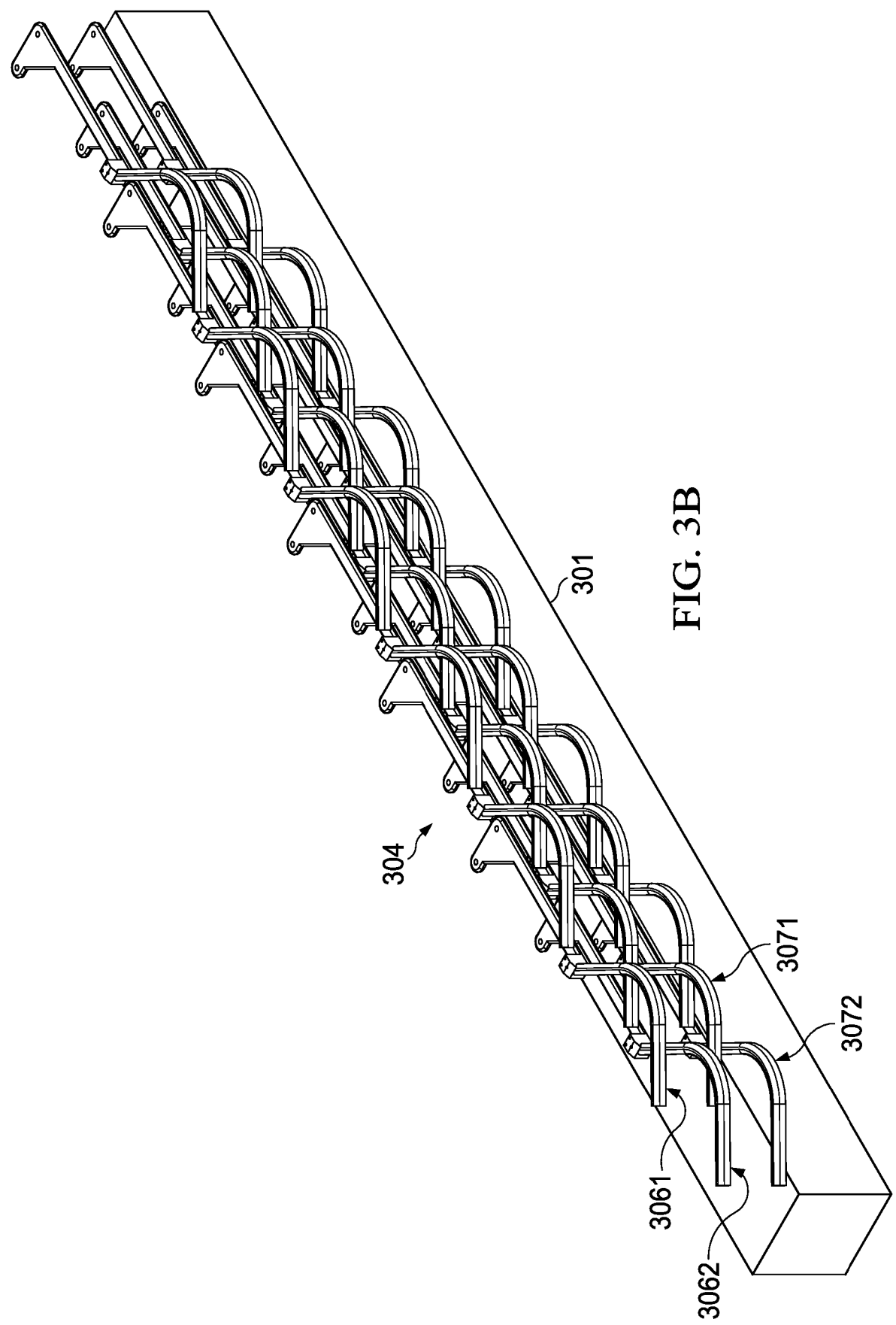
FIG. 3B is a perspective view of an embodiment of twenty-four contact arms arranged in four layers.

As shown in FIG. 3B, in an embodiment twenty four contact arms 105 are arranged in four layers (wherein each layer comprises six contact arms 105) and affixed, connected, and/or mounted to a stabilizing interface 301. In an embodiment, stabilizing interface 301 may be secured to a floor, wall, column, curb, rail, other support structure, or combinations thereof via screw, bolt, nail, adhesive, weld, solder, clamp, other fastening component, or combination thereof. In an embodiment, stabilizing interface 301 may comprise feet, wheels, pads, other support components, or a combination thereof allowing the stabilizing interface to be non-permanently positioned. In an embodiment, the stabilizing interface 301 is configured so that the layers of contact arms associated with it may be positioned (and repositioned as desired) at a height sufficient to contact the appropriate portions of charging contact 400 or charging contact assembly 405 which are affixed/coupled to a mobile object, e.g., a shopping cart as described in U.S. Pat. No. 7,782,194, the entirety of which is incorporated by reference herein.

Figure 9:
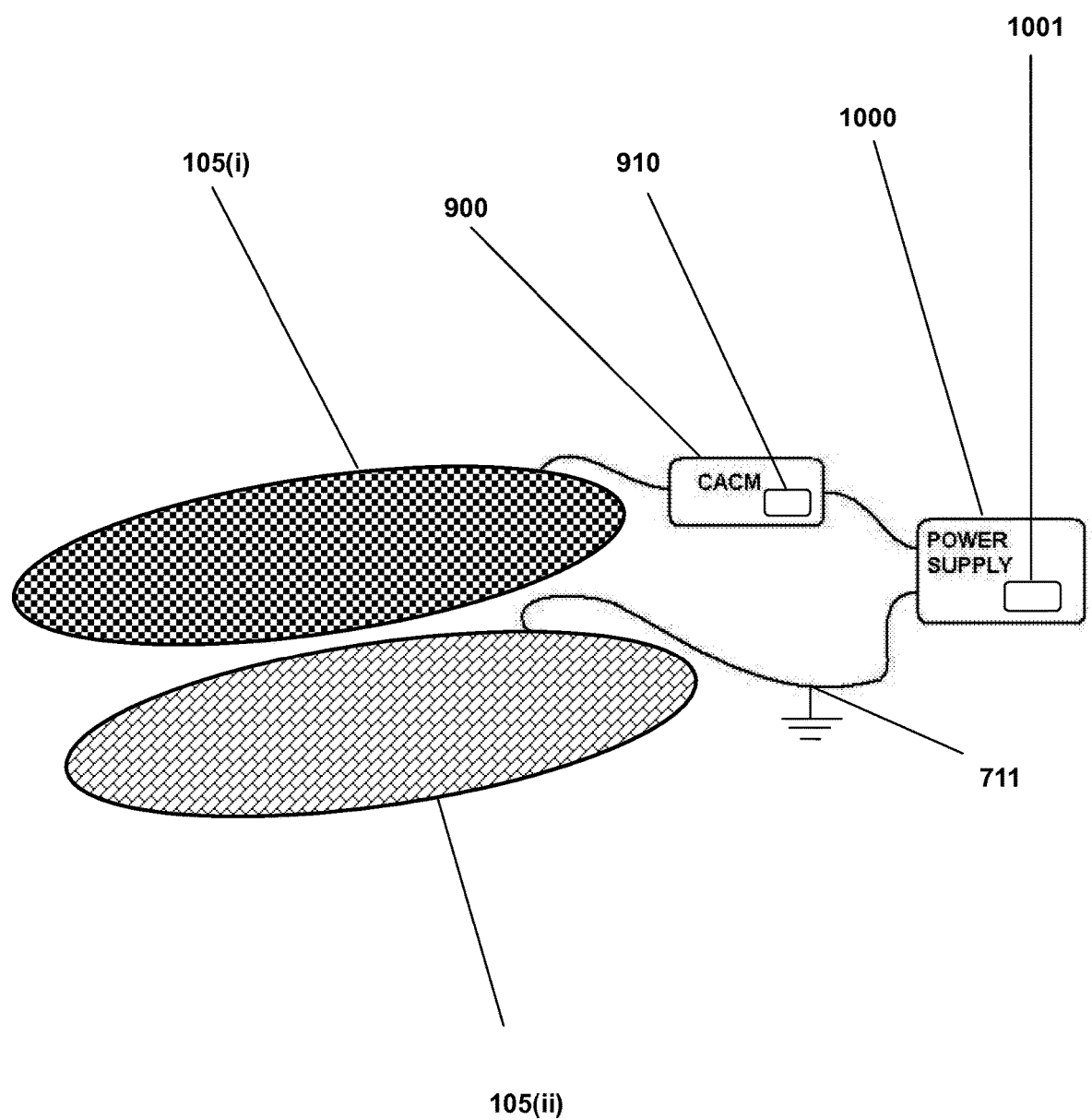
FIG. 9 is a depiction of an embodiment of a pair of contact arms and associated circuitry.

Referring to FIG. 9, in an embodiment, each of the contact arm's charging contact area 104*a* is connected to a power source 1000. In other embodiments, only a selected number of the contact arm's charging contact area 104*a* may be connected to a power source 1000.

In an embodiment, power source 1000 comprises at least one power component 1001. Power source 1000, power component 1001, or a combination thereof may be located inside, under, on, above, below, adjacent to, or in proximity to stabilizing interface 301.

In an embodiment, power source 1000 may comprise a plurality of power components 1001. In an embodiment, power component 1001 may comprise an alternating current ("AC")-powered direct current ("DC") power supply. For example, power component 1001 may comprise an AC-powered 15V DC power supply. In an embodiment wherein the power source 1000 comprises a plurality of power components 1001, the plurality of power components 1001 may be selected to provided "X" amount of power per each "Y" amount of length of layer of contact arms 105, e.g., two 500 Watt power supplies for each three feet contact arm 105 layer length.

Figure 6A:
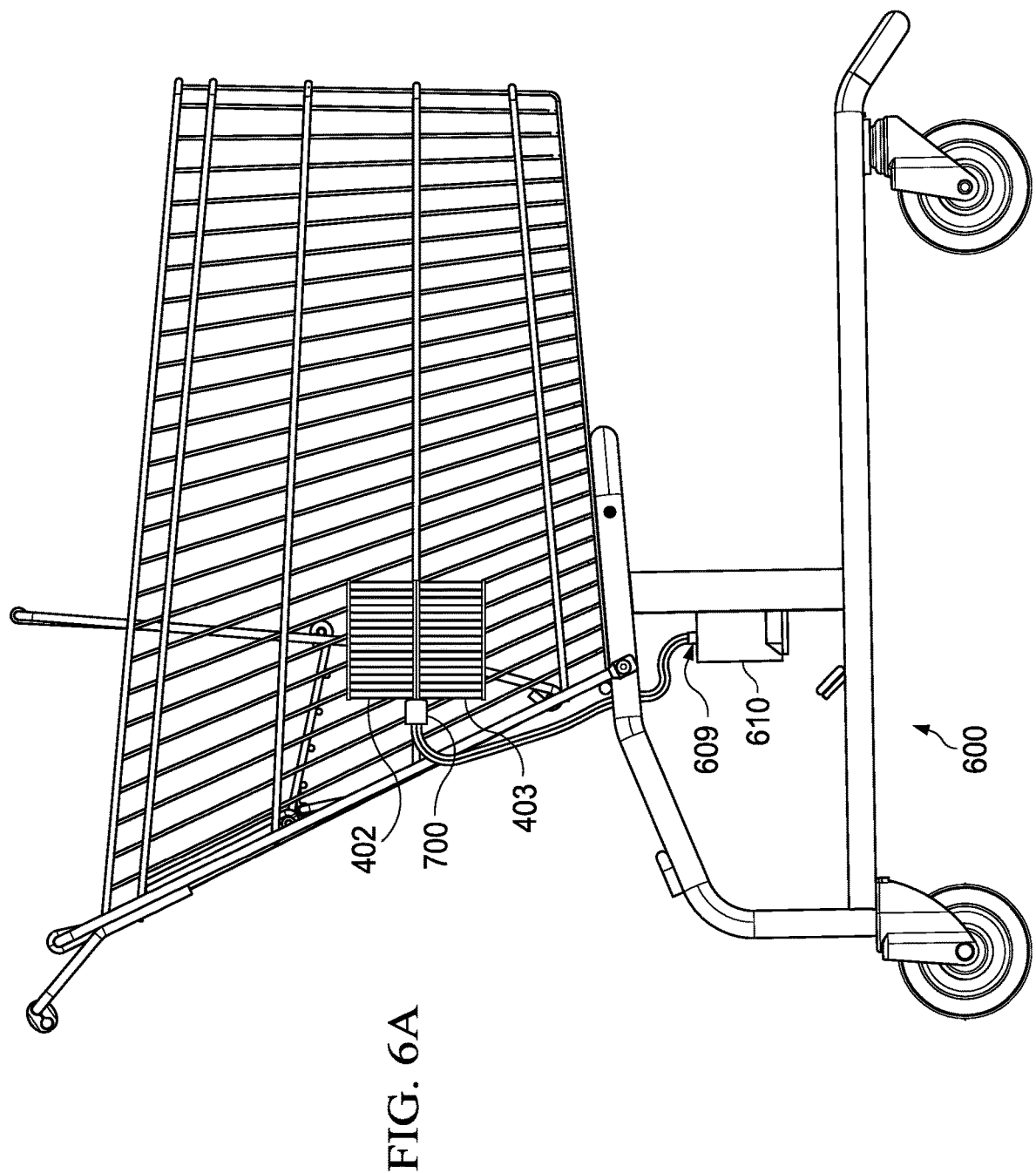
FIG. 6A is a side view of an embodiment of a shopping cart with two charging contacts affixed.

In another embodiment, power source 1000 may comprise a non-AC-powered DC power component 1001. In an embodiment, the power component's 1001 DC power supply may not be rechargeable, hence disposable. In another embodiment, the DC power supply may be rechargeable, e.g., a rechargeable battery 610 as depicted in FIGS. 6A and 6B.

In an embodiment comprising multiple layers of contact arms 105, as shown in FIGS. 3A and 3B, certain layer(s) of contact arms 105 are designated to provide voltage to the charging contact 400 or charging contact assembly 405 and certain layer(s) of contact arms 105 are designated to provide the ground. In an embodiment, as disclosed in FIG. 3A, the upper layer 306 may supply the voltage and the lower layer 307 may supply the ground, or vice versa depending on the configuration of related charging contact 400 or charging contact assembly 405. In an embodiment, as illustrated in FIG. 3B, the upper two layers of contact arms 105, e.g., layers 3061 and 3062, may supply the voltage and the lower two layers of contact arms 105, e.g., layers 3071 and 3072, may supply the ground, or vice versa depending on the configuration of related charging contact 400 or charging contact assembly 405.

As shown in FIG. 9, power contact arm 105(i) is connected to a current flow monitoring module, e.g., Contact Arm Circuit Module (CACM) 900, and ground contact arm 105(ii) is connected directly to ground (711).

As also shown in FIG. 9, CACM 900 comprises a programmable micro-controller 910. The micro-controller 910 monitors voltage difference between monitored nodes. This voltage difference indicates the amount of current flowing from contact arm 105 to charging contact 400 or charging contact assembly 405. CACM 900 monitors the current flowing through charging contact arm 105(i) and determines when a desired current profile is detected, e.g., a current profile generated from a contacted current profile generating module, e.g., Cart Contact Circuit Module ("CCCM") 700 (as will be described more fully herein with regard to FIGS. 4A, 4B, and 4C). The CACM 900 may determine whether a valid electrical contact has been made by detecting a desired current profile for a period of time. After a desired current profile is consistently detected for selected time period, (e.g., any amount of time within a range of from about 0.01 seconds to about 60 seconds, for this example, 1 sec) the CACM 900 will begin providing enough current for the associated current profile. While current is flowing, the current profile signature is continuously monitored. In an embodiment, CACM 900 may deliver current to a battery charging circuit 609, as depicted in FIGS. 6A and 6B, which may, in turn, deliver current to charge a battery 610, as depicted in FIGS. 6A and 6B. If interrupted, the micro-controller 910 turns off the charging current. For example, should a shopping cart be moved so that the CCCM 700 loses contact with the CACM 900, the signature will be interrupted and this logic turns off the charging current. Additionally, if a short circuit falls across power contact arms 105(i) and ground contact arms 105(ii); logic turns off the charging current. This can be the case if, for example, a metal frame of a shopping cart touches both the power contact arms 105(i) and ground contact arms 105(ii).

Figure 8A:
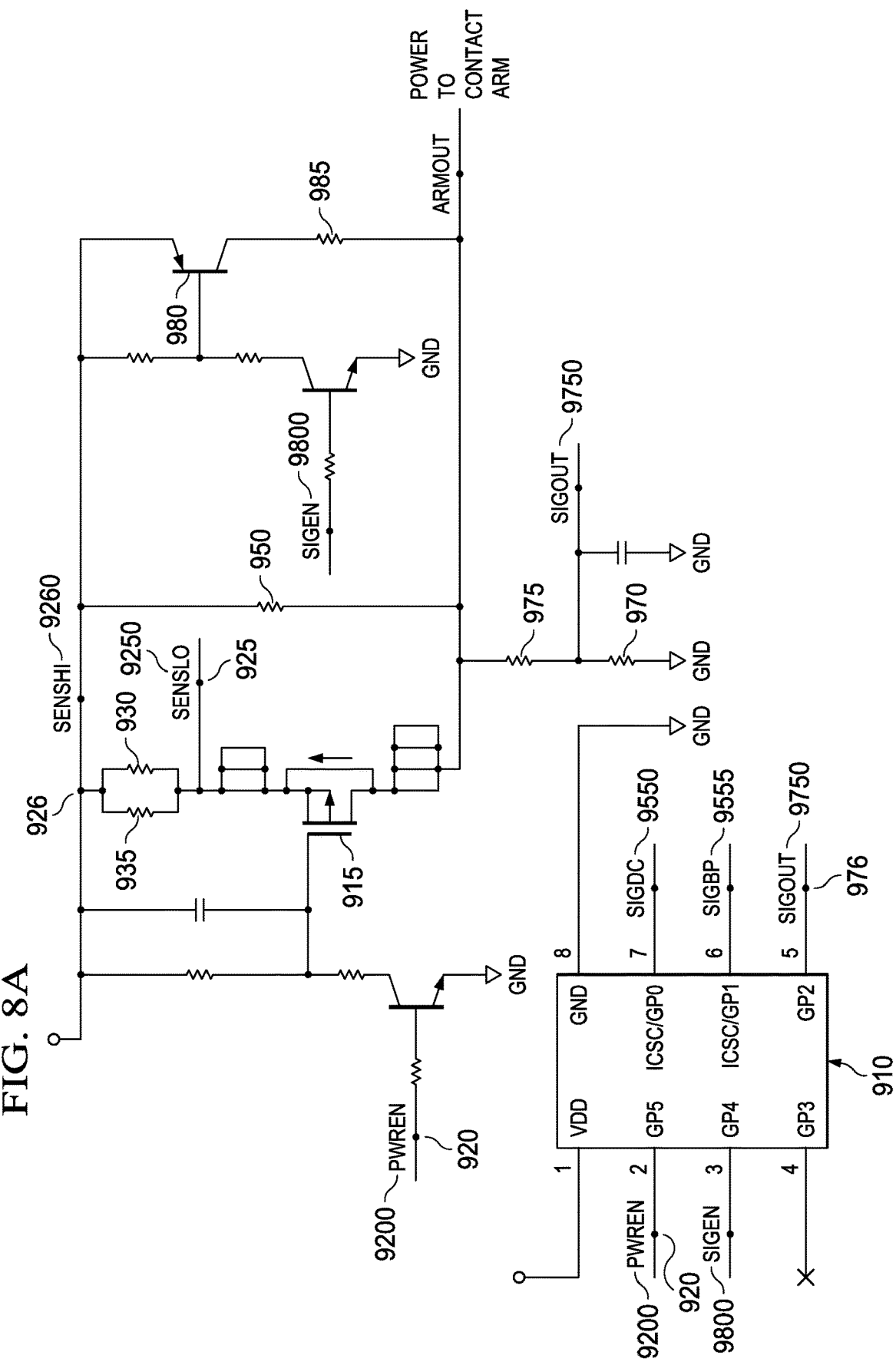
FIG. 8A is a schematic diagram of a Contact Arm Circuit Module.
Figure 8B:
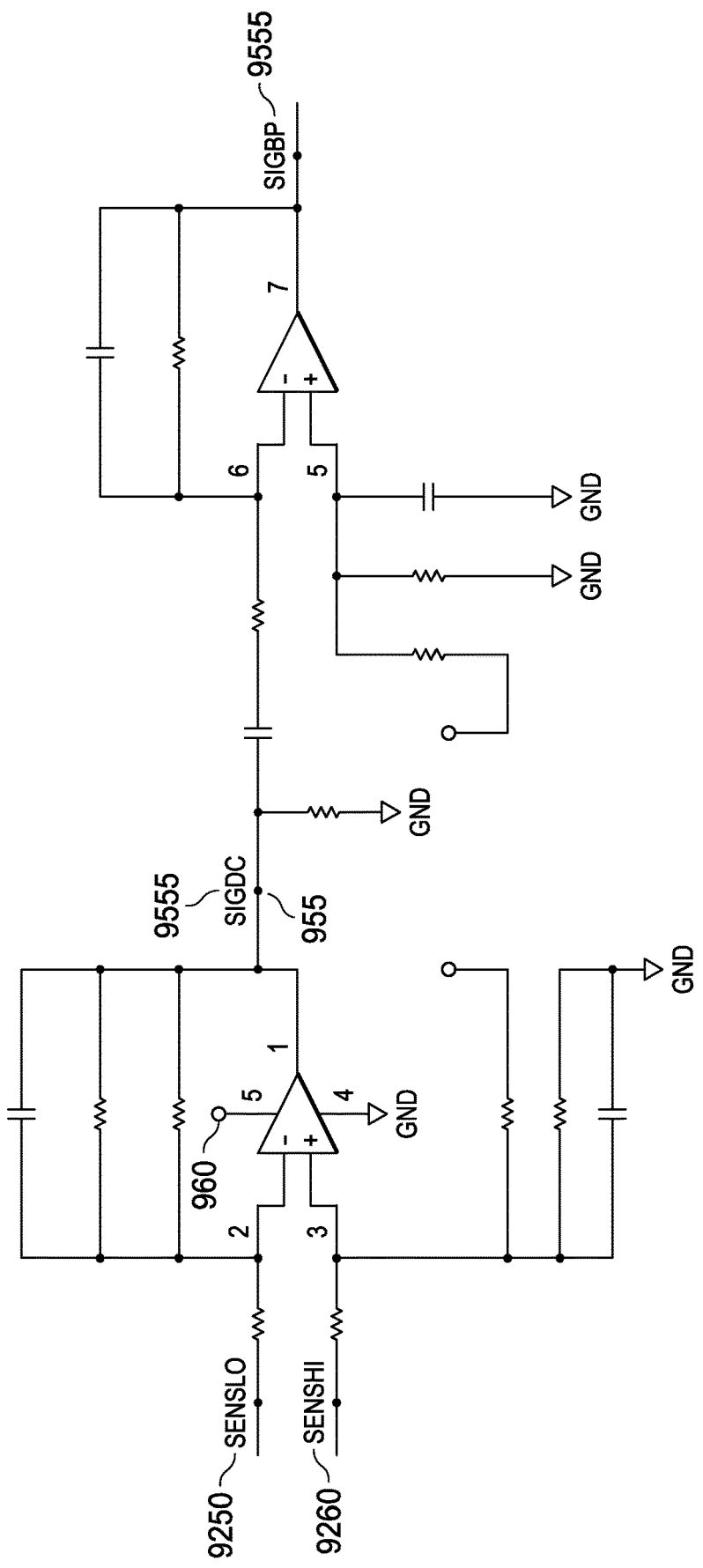
FIG. 8B is a schematic diagram of a Contact Arm Circuit Module.

FIGS. 8A and 8B illustrate an embodiment of internal circuitry of the CACM 900. As shown the CACM 900's circuitry may comprise: (i) a programmable micro-controller 910; (ii) a field effect transistor 915, functioning as a power switch, controlled by signal 9200 (designated as "PWREN") which allows the micro-controller 910 to flow current freely to the power contact arm 105(i); (iii) resistive current sensor 930 and resistive current sensor 935 which develop a signal 9250 (designated as "SENSLO") in response to the amount of current flowing through field effect transistor 915 to the contact arm 105(i); (iv) operational amplifier 960 together with associated discrete components which condition and amplify the signal at SENSLO node 925 to yield signal 9550 (designated as "SIGDC"), and then further condition and amplify the SIGDC signal 9555 to yield a band-passed version 9555 (designated as "SIGBP"); (v) a voltage divider 970 and voltage divider 975 which develop a signal 9750 (designated as "SIGOUT") which allows the micro-controller 910 to measure the voltage present at the contact arm 105(i); (vi) a transistor switch 980 and current limiter controlled by signal 9800 (designated as "SIGEN") which allows the micro-controller 910 to communicate digitally with the CCCM 700.

In an embodiment, the micro-controller 910 first drives signal PWREN 9200 low to turn off field effect transistor 915, and also drives SIGEN signal 9800 low, so that the contact arm 105(i) is connected to 15V through resistor 950. In this state, the microcontroller monitors SIGOUT signal 9750 for a 15 kHz signal indicating a CCCM 700 is in contact and is modulating the current drawn. After the micro-controller 910 detects this signal for an appropriate time (e.g. in a range of 1-10 seconds) it drives PWREN signal 9200 high to enable power to flow through field effect transistor 915. In this state current is flowing freely to the CACM 900, allowing battery charging. While driving PWREN signal 9200 high the micro-controller 910 monitors SIGDC 9550 signal and SIGBP 9555 signal to determine the characteristics of the current flow. A 15 kHz toggling signal is detectable at SIGBP node 955, and SIGDC signal 9550 includes information on the average value of the current. If any inappropriate condition is detected (e.g. SIGDC signal 9550 indicates too much or too little current flow, or the 15 kHz toggle disappears), then the micro-controller drives PWREN signal 9200 low to turn off field effect transistor 915.

In an embodiment, the micro-controller 910 receives digital communications from the CCCM 700 by detecting modulations to the signals at SIGOUT node 976 and/or SIGBP node 955. For example, a zero bit can be received when 10 kHz toggling is detected, and a one bit can be received when 20 kHz toggling is detected. The digital information communicated from the CCCM 700 to the CACM 900 can include a serial number assigned to a shopping cart 600, and status information regarding the shopping cart 600.

In an embodiment, the CACM micro-controller 910 transmits digital information to the CCCM 700 by toggling SIGEN signal 9800. For example, the micro-controller 910 can toggle SIGEN signal 9800 at 10 kHz to indicate a 0 bit, or at 20 kHz to indicate a 1 bit. The digital information communicated from the CACM 900 to the CCCM 700 can include a serial number assigned to the contact arm 105, or queries or commands.

Figure 4A:
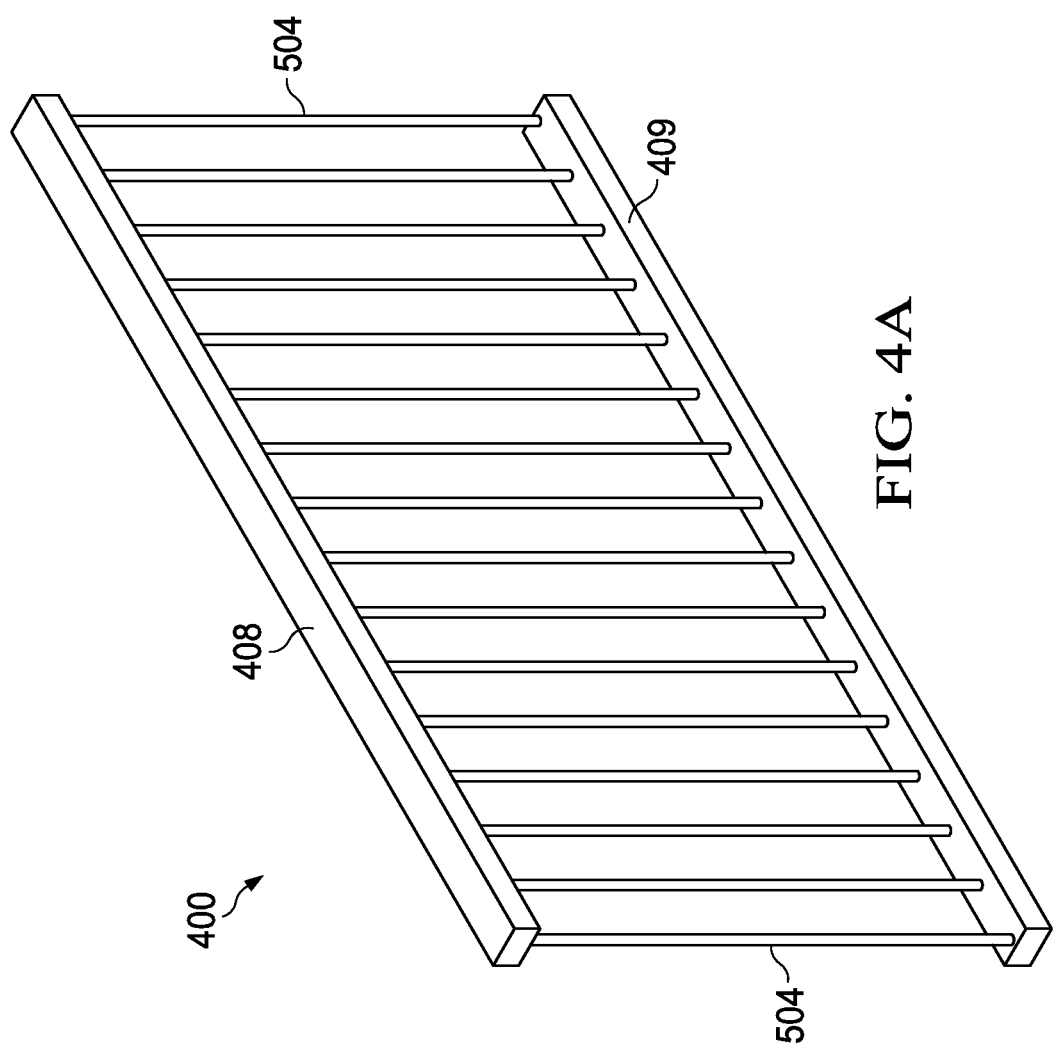
FIG. 4A is a perspective view of an embodiment of a charging contact.

FIG. 4A illustrates an example of an electrical contact, i.e., charging contact 400. Charging contact 400 is electrically connected to an electrical power consuming vehicle's battery 610 (and/or batteries) and functions as a connective interface between the electrical power consuming vehicle's battery 610 (and/or batteries) and contact arm's 105 connected electric power source 1000. As noted, charging contact 400 may be mounted on electrical power consuming vehicles, e.g., shopping carts, strollers, dollies, hand-trucks, golf carts, fork lifts, electric automobiles, scooters, go-carts, and battery-powered ride-on toy vehicles. In embodiments of the instant invention wherein a charging contact 400 is employed, the electrical power consuming vehicle (for ease of reference the term "shopping cart 600" may be employed as a catch-all term for all electrical power consuming vehicles; thus, references to "shopping cart 600" are not limiting, but rather merely expedient) may comprise a plurality of charging contacts 400. In embodiments comprising two charging contacts 400, as shown in FIG. 6A, one charging contact 402 is dedicated to contacting certain layer(s) of contact arms 105 which are designated to provide voltage and the other charging contact 403 is dedicated to contacting certain layer(s) of contact arms 105 which are designated to provide the ground. Of course, depending on the arrangement of the layers of charging arms 105, the functions of charging contacts 402 and 403 could be reversed.

Figure 5:
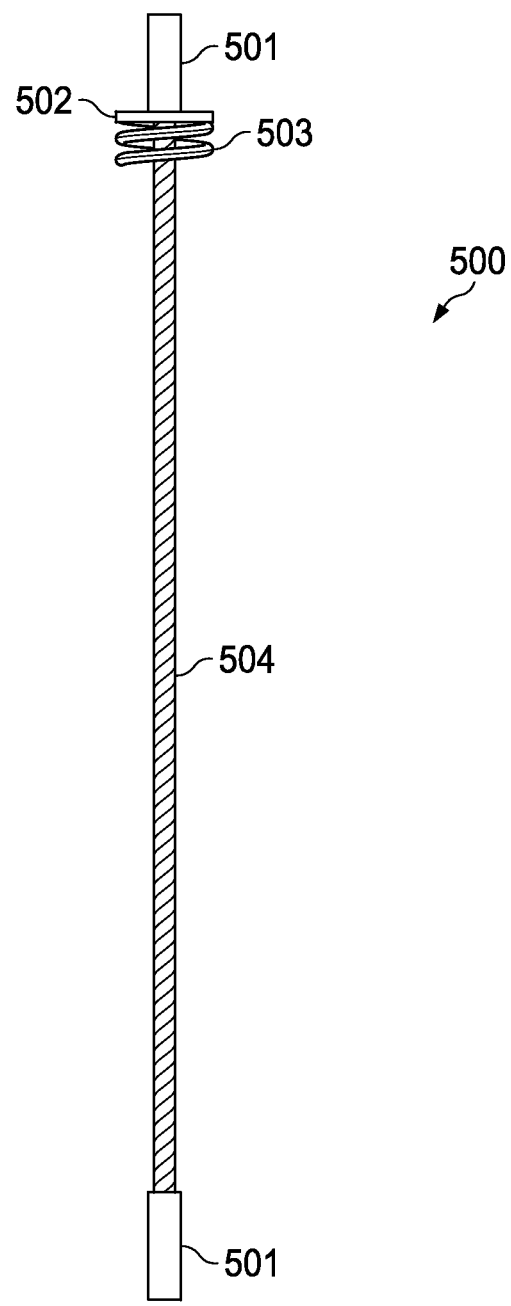
FIG. 5 is a side view of an embodiment of a single wire segment.

As shown in FIG. 4A, in an embodiment, charging contact 400 may comprise at least one frame. In another embodiment, charging contact 400 may comprise a plurality of frames. The charging contact's 400 frame may comprise, e.g., be made of, a naturally occurring substance, plastic, metal, composite material, polymeric substance, and/or a combination thereof. The charging contact 400 may be shaped in any fashion desired as long as the shape does not interfere with the charging contact's 400 functioning as an effective electrical charge conductor. Charging contact 400 may be attached to shopping cart 600 via screw, bolt, nail, adhesive, weld, solder, clamp, other fastening component, or combination thereof. Between frame sections 408 and 409, wire 504 is exposed. In an embodiment, the exposed wire 504 may comprise a single strand of wire 504, e.g., a singular wire segment 500, as illustrated in FIG. 5, which is strung between frame sections 408 and 409. In another embodiment, the exposed wire 504 may comprise a plurality of wire segments 500, e.g. each wire 504 corresponds to a separate wire segment 500. In an embodiment, the exposed wire 504 may be positioned so that each strand of wire 504 contacts adjacent wire 504 strand(s). In an embodiment, the exposed wire 504 may be positioned so that each strand of wire 504 does not contact adjacent wire 504 strand(s), for example, the wire 504 strands may be positioned equidistance apart, may be positioned at differing distances apart, or a combination thereof. In an embodiment, some wire 504 strands may contact other wire 504 strands while some wire 504 strands do not contact other wire 504 strands. In an embodiment wherein the wire 504 strands do not contact other wire 504 strands, the wire stands may be positioned apart at any particular distance included in the range of about 0.1 in. to 24 in. In an embodiment, the wire strands may be positioned about 0.5 in. apart.

In an embodiment, as depicted in FIG. 4A, charging contact 400 may comprise a length, e.g.: in a range of about 0.1 in. to about 240 in.; in a range of about 1 in. to about 120 in.; in a range of about 2 in. to about 60 in., in a range of about 3 in. to about 30 in., in a range of about 4 in. to about 15 in., or in a range of about 56 in. to about 10 in. In an exemplary embodiment, charging contact 400 may comprise a length of, or about, 10 in. In an embodiment, charging contact 400 may comprise a width, e.g.: in a range of about 0.1 in. to about 240 in.; in a range of about 1 in. to about 120 in.; in a range of about 2 in. to about 60 in., in a range of about 3 in. to about 30 in., in a range of about 4 in. to about 15 in., or in a range of about 5 in. to about 10 in. In an exemplary embodiment, charging contact 400 may comprise a width of, or about, 8 in.

Referring to FIG. 5, an example of a single wire segment 500 is shown in detail. Wire 504 may comprise any electrically conductive material (e.g., iron, copper, gold, silver, bronze), or combinations thereof and may be coated and/or combined with other elemental or synthetic coatings (e.g., phosphor, plastic). In an embodiment, the wire 504 may be a phosphor bronze wire rope. Wire 504 may be capped at each end 501, e.g., a first capped end and a second capped end, as to prevent the wire 504 from unraveling. End 501 is also configured so as to prevent end 501 from passing through an opening in frame segment 408 and/or frame segment 409, the opening in which wire 504 does pass through. Wire segment 500 may also comprise a restriction element, e.g., a fitting, stop, flange, washer, or other circumference/width increasing element. For ease of reference, the fitting, stop, flange, washer, or other circumference/width increasing element will be referred to as washer 502, such reference to washer 502 is not limiting but should be understood to be merely for convenience purposes. In an embodiment, washer 502 may configured to have an interior opening large enough to allow wire 504 to pass through while the interior opening is not large enough to allow the entirety of end 501 to pass through. In another embodiment, washer 502 may be affixed/incorporated into end 501, e.g., via weld, solder, adhesive, or as a singularly manufactured unit. Between washer 502 and frame segment 408 and/or frame segment 409 will be positioned a tensioning component which effects the wire's 504 amount of flex by controlling the amount of tension in the wire segment 500. The diameter/width of washer 502 is such that washer 502 may provide a seating location for the wire segment's 500 tensioning component. The tensioning component may comprise a spring, a bushing, a band, flexible feature of frame functioning as an archery bow-type component, or other resilient component. In an embodiment, helical springs may serve as wire 504, wherein the helical springs may be pre-tensioned via attachment to a ridged frame which would anchor the ends of the helical springs. In an embodiment, the tensioning component is spring 503, such reference to washer 502 is not limiting but should be understood to be merely for convenience purposes. Spring 503 and washer 502 may be mounted on the outside the frame segment 408 and/or frame segment 409, so that spring 503 controls the tension in wire segment 500. The spring 503, i.e., wire segment 500, may be pre-tensioned, e.g., the spring 503 may be partially compressed prior to and interaction between the charging contact 400 and contact arm 105. In an embodiment, the spring 503 may be pre-tensioned via actuation of a screw-type area located at an end 501 of wire segment 500, wherein the screw-type area of end 501 interacts with a screw-type receiving portion of the opening in frame segment 408 and/or frame segment 409 through which wire 504 passes. The interaction of the screw-type area of end 501 and the frame segment 408 and/or frame segment 409, allows the tension in the spring 503 to be adjusted based upon varying the distance between the washer 502 and frame segment 408 and/or frame segment 409; thus compressing or expanding spring 503. In another embodiment, the tension on spring 503 may be adjusted by altering a selectable distance between frame segment 408 and frame segment 409.

In an embodiment, the flexibility (e.g., tensioning) of wire segment 500 allows wire 504 of the charging contact 400 to contact much more of the charging contact arm 105, e.g., the convex portion of the curved cross-section 210, than would otherwise occur in the absence of the wire segment's 500 flexibility (e.g., absent the flexibility of wire segment 500, the wire 504 may only contact the charging contact arm 105 at one point). It is advantageous if the tension in these rope segments in controlled, e.g., allowing for the wire 504 to contact the charging contact arm 105 at multiple points. An effect of allowing wire 504 to contact charging contact arm 105 at multiple points is that the contact resistance is lower than with a single point of contact, and so localized resistive heating is minimized.

In an embodiment, wire segments 500 of the charging contact 400 are electrically connected in common. In other embodiments, portions of the wire segments 500 of the charging contact 400 are electrically connected in common, e.g., the wire segments 500 from about the midpoint of charging contact 400 to the right outside are electrically connected in common, and the wire segments 500 from about the midpoint of charging contact 400 to the left outside are electrically connected in common, however each of the portions ("midpoint to right outside" and "midpoint to left outside") are electrically isolated. The wire segments 500 of charging contact 400 may be electrically connected in common, i.e. apportioned, in groups of 1, 2, 3, 4, 5, 6, or more. The apportionment of the charging contact's 400 wire segments 500 provides for multiple, separate electric energies to be delivered from the power supply 1000 to facilitate more efficient electrical connections and recharging activities. Each group of electrically isolated wire segments 500 are connected to a Cart Contact Circuit Module ("CCCM").

Figure 4B:
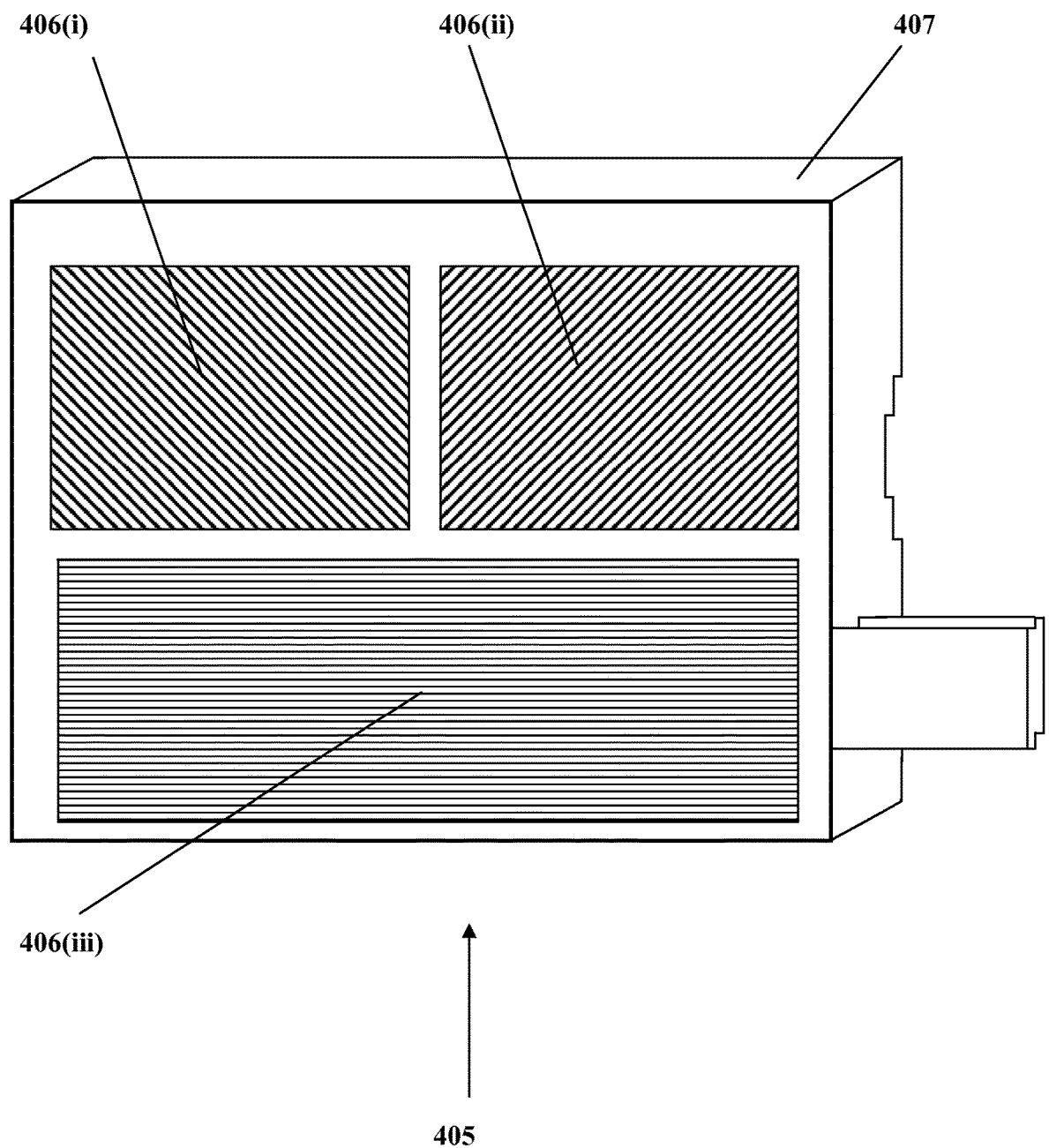
FIG. 4B is a perspective view of an embodiment of a charging contact assembly.
Figure 4C:
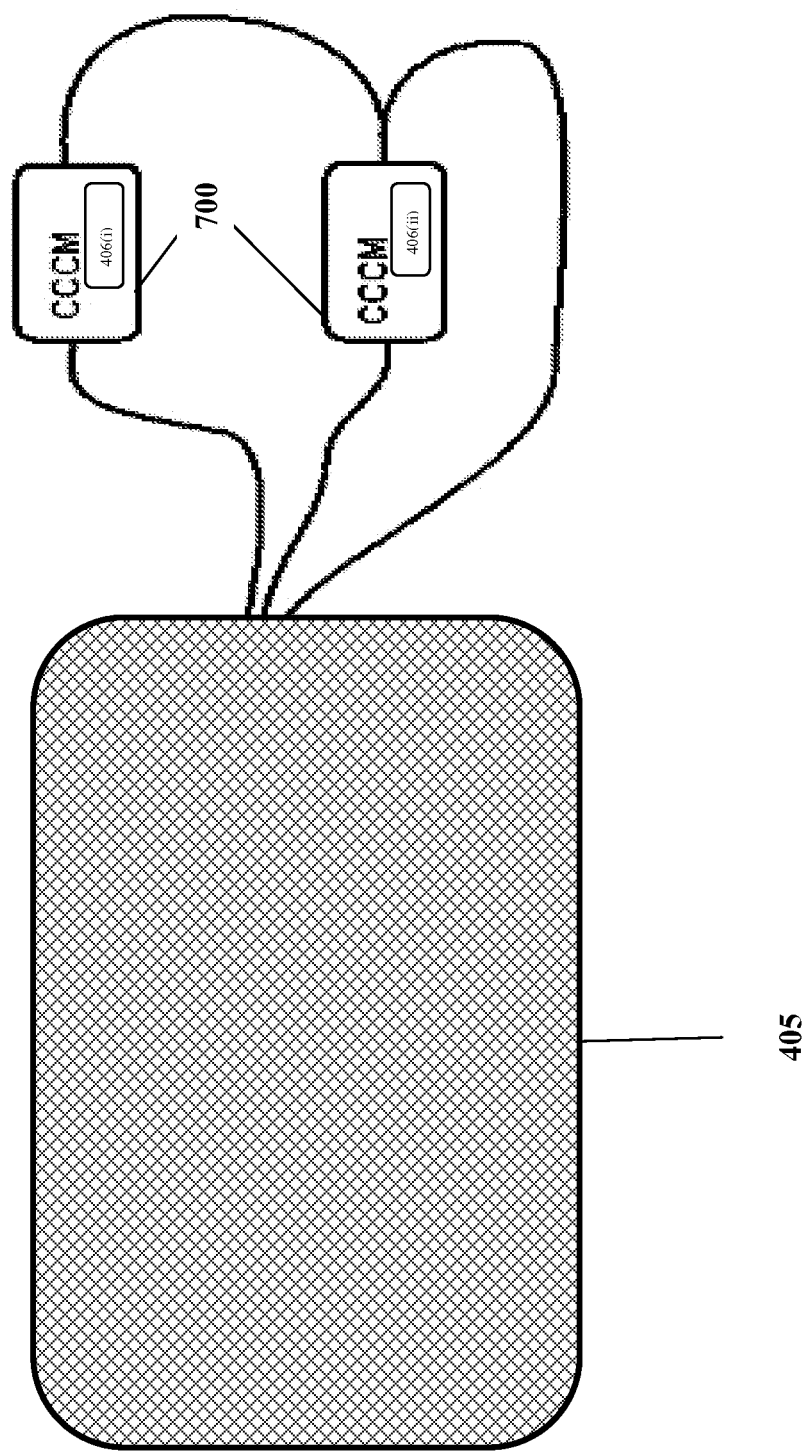
FIG. 4C is a depiction of an embodiment of a charging contact assembly and associated circuitry.

FIGS. 4B and 4C illustrate an embodiment of an electrical contact, i.e., charging contact assembly 405. Charging contact assembly 405 is electrically connected to an electrical power consuming vehicle's battery 610 (and/or batteries) and functions as a connective interface between the electrical power consuming vehicle's battery 610 (and/or batteries) and contact arm's 105 connected electric power source 1000. Charging contact assembly 405 may be affixed/coupled/mounted on electrical power consuming vehicles, e.g., shopping carts, strollers, dollies, hand-trucks, golf carts, fork lifts, electric automobiles, scooters, go-carts, and battery-powered ride-on toy vehicles. In embodiments of the instant invention wherein a charging contact assembly 405 is employed, the electrical power consuming vehicle (again, for ease of reference the term "shopping cart 600" may be employed as a catch-all term for all electrical power consuming vehicles; thus, references to "shopping cart 600" are not limiting, but rather merely expedient) may comprise a plurality of charging contact assemblies 405.

As shown in FIG. 4B, charging contact assembly 405 comprises a housing 407 to which at least one electrical contact is affixed. Housing 407 may comprise, e.g., be made of, a naturally occurring substance, plastic, metal, composite material, polymeric substance, and/or a combination thereof. Charging contact assembly 405 may be shaped in any fashion desired as long as the shape does not interfere with the charging contact assembly's 405 functioning as an effective electrical charge conductor. Housing 407 facilitates the affixing/attaching/coupling of charging contact assembly 405 to vehicles. Charging contact assembly 405 may be attached to shopping cart 600 via screw, bolt, nail, adhesive, weld, solder, clamp, other fastening component, or combination thereof. As shown in FIG. 6B, charging contact assembly 405 may be mounted on a side of a shopping cart 600.

As also shown in FIG. 4B, charging contact assembly 405 comprises at least one electrical contact 406 and may comprise a plurality of electrical contacts 406 (as indicated by FIG. 4B, each electrical contact 406 is differentiated by enumerating the electrical contacts as 406(*i*), 406(*ii*), and 406(*iii*)). In an embodiment wherein charging contact assembly 405 comprises a plurality of electrical contacts 406, electrical contacts 406 may each be the same shape and size or may each be a different shape and a different size than that of the remainder of the electrical contacts 406. In an embodiment, electrical contacts 406(*i*) and 406(*ii*) may comprise a length: in a range of about 0.1 in. to about 120 in.; in a range of about 1 in to about 60 in., in a range of about 3 in. to about 30 in., in a range of about 4 in. to about 15 in., or in a range of about 5 in. to about 10 in. In an exemplary embodiment, electrical contacts 406(*i*) and 406 (*ii*) may comprise a length of, or about, 4 in. In an embodiment, electrical contacts 406(*iii*) may comprise a length: in a range of about 0.1 in. to about 240 in.; in a range of about 0.5 in. to about 120 in.; in a range of about 1 in to about 60 in., in a range of about 3 in. to about 30 in., in a range of about 4 in. to about 15 in., or in a range of about 5 in. to about 10 in. In an exemplary embodiment, electrical contacts 406(*i*) and 406(*ii*) may comprise a length of, or about, 8 in. In an embodiment, electrical contacts 406 may comprise a width: in a range of about 0.1 in. to about 120 in.; in a range of about 1 in. to about 60 in., in a range of about 3 in. to about 30 in., in a range of about 4 in. to about 15 in., or in a range of about 5 in. to about 10 in. In an exemplary embodiment, electrical contacts 406 may comprise a width of, or about, 3 in.

In an embodiment, as depicted in FIG. 4B, charging contact assembly 405 may comprise a length, e.g.: in a range of about 0.1 in. to about 240 in.; in a range of about 1 in. to about 120 in.; in a range of about 2 in. to about 60 in., in a range of about 3 in. to about 30 in., in a range of about 4 in. to about 15 in., or in a range of about 5 in. to about 10 in. In an exemplary embodiment, charging contact assembly 405 may comprise a length of, or about, 10 in. In an embodiment, charging contact assembly 405 may comprise a width, e.g.: in a range of about 0.1 in. to about 240 in.; in a range of about 1 in. to about 120 in.; in a range of about 2 in. to about 60 in., in a range of about 3 in. to about 30 in., in a range of about 4 in. to about 15 in., or in a range of about 5 in. to about 10 in. In an exemplary embodiment, charging contact assembly 405 may comprise a width of, or about, 8 in.

Electrical contact 406 may comprise, e.g., be made of, any electrically conductive material (e.g., iron, copper, gold, silver, bronze), or combinations thereof. In an embodiment wherein charging contact assembly 405 comprises a plurality of electrical contacts 406 or may each comprise a different electrically conductive material from the remainder of the electrical contacts 406. In an embodiment, electrical contact 406 may comprise a wire segment 501 or plurality of wire segments 501, as shown in FIG. 5. In an embodiment, electrical contact 406 may comprise a solid or semi-solid electrically conductive material, e.g., mesh, foil, or lattice, as shown in FIG. 4B. As shown in FIG. 4C, each of charging contact assembly's 405 electrical contacts 406(*i*) and 406(*ii*) are connected to a Cart Contact Circuit Module ("CCCM").

Figure 7B:
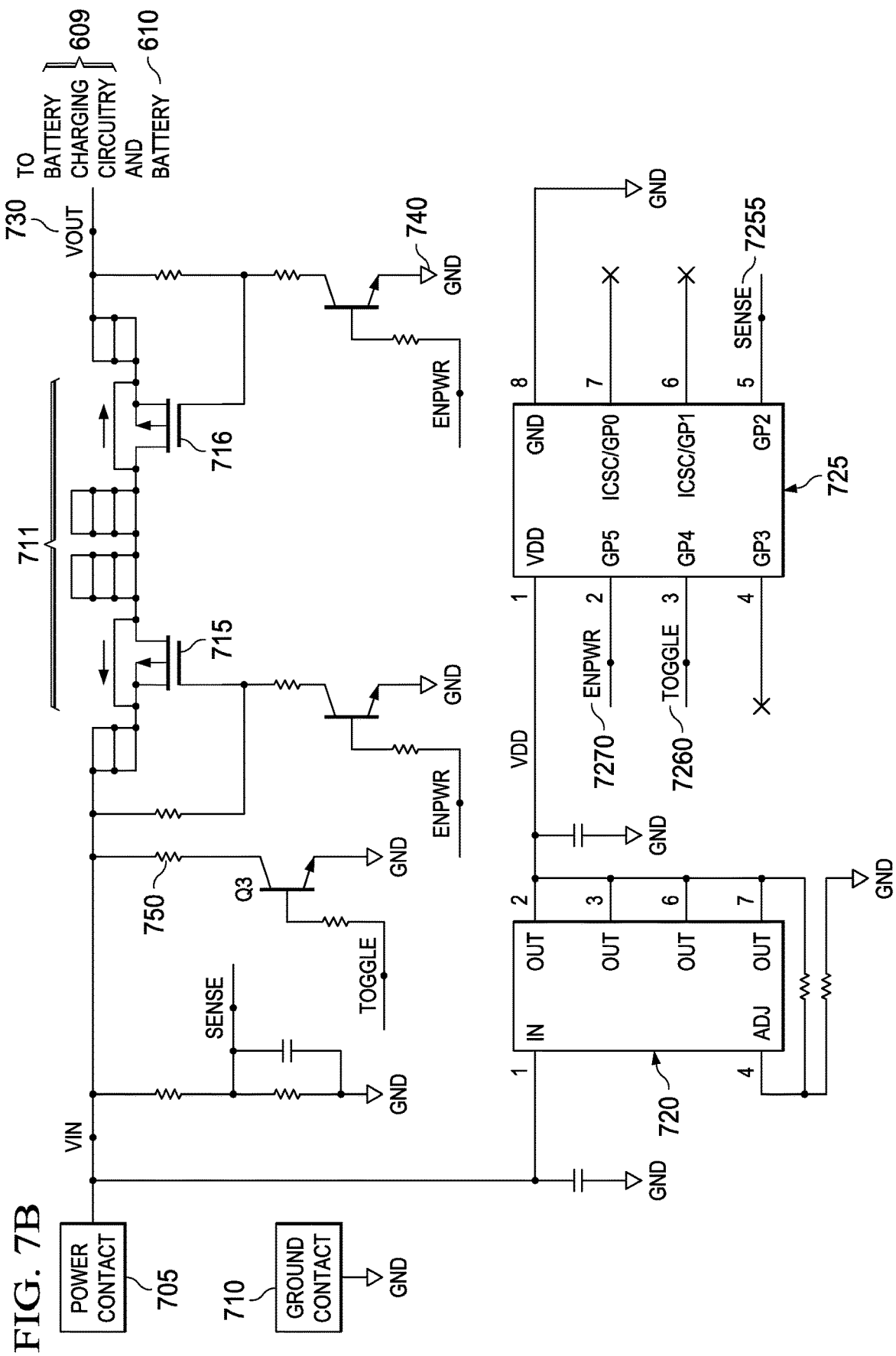
FIG. 7B is a schematic diagram of a Cart Contact Circuit Module.

As shown in FIG. 7B, in an embodiment, CCCM 700 has two input connections and two output connections. The inputs are power contact 705 and the ground contact 710. The outputs are power (designated as "VOUT") 730 and ground 740 which connect to battery charging circuitry 609 and battery 610. As shown in FIG. 7, power contact 705 connects as such: (i) a voltage regulator 720 which delivers clean 5V power to micro-controller 725; (ii) a voltage divider circuit which delivers signal 7255 (designated as "SENSE") to the micro-controller 725, allowing the micro-controller 725 to calculate the voltage at the power contact 705; (iii) a current sink 750 which can be alternately turned on and off at approximately 15 kHz by the micro-controller's 725 toggling signal 7260 (designated as "TOGGLE"); and (iv) field effect transistor switches 711 comprised of components 715 and 716 which allows the micro-controller 725 to connect power from the power contact 705 to the battery charging circuitry 609 and battery 610.

In an embodiment, when a power contact arm 105(*i*) connected to power touches the power contact 705, and a ground contact arm 105(*ii*) connected to ground touches the ground contact 710, the voltage regulator 720 delivers a small amount of power to the micro-controller 725. The micro-controller 725 first drives signal 7270 (designated as "ENPWR") low to turn off the field effect transistor 711 switches, and then starts toggling the TOGGLE signal 7260 at approximately 15 kHz. While doing this, the micro-controller 725 monitors the SENSE signal 7255 to determine the voltage present at the power contact 705. When this voltage reaches the expected value (e.g. 15V), and stays steady for a period of time (e.g. any value from 1 to 20 seconds) then the micro-controller 725 recognizes that valid contact has been made at both power contact 705 and ground contact 710, and therefore drives ENPWR signal 7270 high to turn on the field effect transistor 711 switches. This allows current to flow to the battery charger circuitry 609 and battery 610. While driving ENPWR signal 7270 high, the micro-controller 725 continues to toggle TOGGLE signal 7260 and continues to monitor the SENSE signal 7255. If the voltage at the SENSE signal 7255 indicates that there is no longer the expected voltage at the power contact 705 (e.g. 15V), the micro-controller 725 drives ENPWR signal 7270 low to stop the flow of current to the battery charger circuitry 609 and battery 610.

In an embodiment, the CCCM's micro-controller 725 modulates the TOGGLE signal 7260 in such a way as to communicate digital information to the CACM 900, for example, by driving the TOGGLE signal 7260 at 10 kHz to indicate a 0 bit, or at 20 kHz to indicate a 1 bit. The digital information communicated from the CCCM 700 to the CACM 900 can include a serial number assigned to the cart, and status information regarding the cart.

In an embodiment, the CCCM's micro-controller 725 receives digital information from the CACM 900 by monitoring the SENSE signal 7255. For example, the CACM can modulate the voltage at the power contact arm 105(*i*) connected to power so that the voltage delivered to the power contact 705 toggles between 14V and 16V at 10 kHz to indicate a 0 bit, or at 20 kHz to indicate a 1 bit. The digital information communicated from the CACM 900 to the CCCM 700 can include a serial number assigned to the power contact arm 105(*i*), or queries or commands.

As evidenced by FIGS. 3B and 9, in an embodiment power transfer station 304 comprises a combination of: (i) contact arms 105 (e.g., layers 3061, 3062, 3071, and 3072); (ii) CACM 900; (iii) stabilizing interface 301; and (iv) power source 1000. Power transfer station 304 may be permanently or non-permanently positioned. In an embodiment, power transfer station 304 may be secured to a floor, wall, column, curb, rail, other support structure, or combinations thereof via screw, bolt, nail, adhesive, weld, solder, clamp, other fastening component, or combination thereof. In an embodiment, power transfer station 304 may comprise feet, wheels, pads, other support components, or a combination thereof which may facilitate non-permanent positioning, e.g., mobility and/or adjustability, of power transfer station 304.

As evidenced by FIGS. 6A and 6B, in an embodiment shopping cart 600 comprises an electrical contact(s), e.g., charging contacts 402 and 403, or charging contact assembly 405, which are electrically connected to a battery 610 (or batteries). As also shown, charging contact 402 and charging contact assembly 405 are also connected to a CCCM 700.

Figure 10:
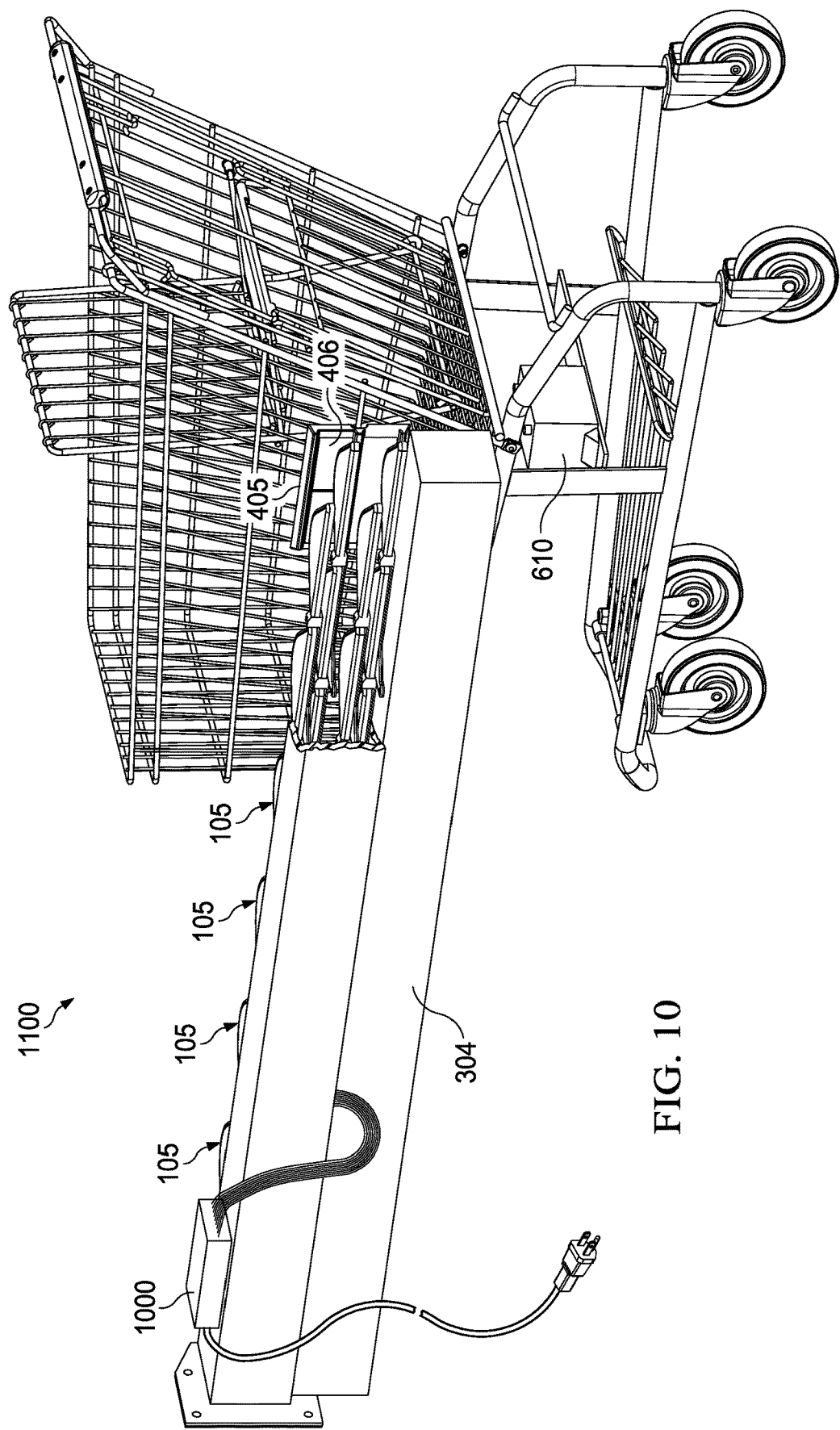
FIG. 10 is a perspective view of an embodiment of a vehicle charging system.

As shown in FIG. 10, in an embodiment vehicle charging system 1100 comprises: (i) an electrical contact(s), e.g., charging contacts 402 and 403, or charging contact assembly 405, which are electrically connected to a battery 610 (or batteries) (charging contact 402 and charging contact assembly 405 are also connected to a CCCM 700, as shown in FIGS. 6A and 6B) and (ii) a power transfer station 304.

The interaction, e.g., an electrical connection for transferring electrical power, of charging contact assembly 405 (or charging contacts 402 and 403, if so configured) and power transfer station 304 may occur at any height above a base which supports a vehicle to which is attached charging contacts 402 and 403, or charging contact assembly 405. In an embodiment, the interaction of charging contact assembly 405 (or charging contacts 402 and 403, if so configured) and power transfer station 304 may occur at a height which is greater than the height of the vehicle's wheels, skids, rollers, blades, tracks, tires, or combination thereof, above the base which supports the vehicle. In an embodiment, the interaction of charging contact assembly 405 (or charging contacts 402 and 403, if so configured) and power transfer station 304 may occur at a height below the top (e.g., the highest point of a vehicle above the base which supports the vehicle) of the vehicle. In an embodiment, the interaction of charging contact assembly 405 (or charging contacts 402 and 403, if so configured) and power transfer station 304 may occur at a height: in a range of about 0.1 in. to 240 in., e.g., at about 24 in., at about 36 in, at about 48 in., at about 60 in, at about 72 in., at about 84 in., etc. In an embodiment, the interaction of charging contact assembly 405 (or charging contacts 402 and 403, if so configured) and power transfer station 304 may occur at, or about, an exterior of a vehicle. In an embodiment, the interaction of charging contact assembly 405 (or charging contacts 402 and 403 if so configured) and power transfer station 304 may occur at, or about, an interior of a vehicle. In an embodiment, the charging contact assembly 405 (or charging contacts 402 and 403, if so configured) and power transfer station 304 may occur as charging contact assembly 405 (or charging contacts 402 and 403, if so configured) is oriented in at, or about, a plane which is substantially perpendicular to the direction of travel of a vehicle. In an embodiment, the interaction of charging contact assembly 405 (or charging contacts 402 and 403 if so configured) and power transfer station 304 may occur as contact arms 105 are oriented in at, or about, planes which are substantially parallel to the direction of travel of a vehicle. The above recited embodiments are not exclusive and may be combined in a plurality of valid combinations to further characterize the interaction of charging contact assembly 405 (or charging contacts 402 and 403, if so configured) and power transfer station 304. For example, charging contact assembly 405 (or charging contacts 402 and 403, if so configured) and power transfer station 304 could interact a height of 18 in. above the base which supports a vehicle (e.g., above the vehicle's wheels, but below the top of the vehicle), wherein the charging contact assembly 405 (or charging contacts 402 and 403, if so configured) is located on an exterior side of the vehicle (e.g., perpendicular to the direction of the vehicle's travel), and wherein the contact arms 105 are oriented in planes which are about parallel to the direction of the vehicle's travel.

The following is an example of an interaction between several of the previously described components. In an embodiment, as shown in FIG. 6A, two charging contacts 400 are mounted on shopping cart 600. The two charging contacts 400 are designated as contacts 402 and 403, and are configured, for example, as a plurality of wires in a frame as shown in FIG. 4A. In this example, charging contact 402 will connect to contact arms 105 to supply an electrical current to the shopping cart 600's battery 610. Charging contact's 402 wire segments 500 are apportioned into to two distinct groups, (i) a first associated portion of charging contact 402 and (ii) a second associated portion of charging contact 402, wherein each group is electrically connected in common, e. g, a first group and a second group, as such one CCCM 700 is attached to the first group and a second CCCM 700 is attached to the second group, for example, as shown in FIG. 4C. Charging contact's 403 wire segments 500 are electrically connected in common and charging contact 403 will be the ground connector. This example further comprises a multiple contact arms 105 assembly embodiment as described in FIG. 3A. In an embodiment, one CACM 900 is attached to each contact arm 105, for example, as shown in FIG. 7A. The spacing of the contact arms 105 in the assembly is such that: (i) the number of contact arms 105 contacting charging contact 402 or 403 is either 1 or 2; never zero (no dead spots); and (ii) the number of power contact arms 105(*i*) contacting either the first group of wire segments 500 or the second group of wire segments 500 of charging contact 402 is either 0 or 1, never 2. As a result of the configurations of the contact arms 105 and the apportionment of the wire segments 500 of the charging contact 402, there is never more than one CCCM 700 connected to each CACM 900. Likewise, there is never more than one CACM 900 connected to each CCCM 700. Further, this example also comprises a +15V power supply 1001, as shown in FIG. 9. Of further note, as shown in FIG. 6A, by placing the +15V (i.e., charging contact 402) and ground (i.e., charging contact 403) in such close proximity, the effective antenna loop size is minimized and spurious electromagnetic emissions are reduced. Thus, facilitating compliance with electromagnetic emissions limits. In an embodiment, the +15V (i.e., charging contact 402) and ground (i.e., charging contact 403) are positioned in as near proximity to each other as operationally possible, thus resulting in minimal effective antenna loop size.

FIG. 7B illustrates the interactions of the above example. As depicted in FIG. 7B, when +15V is applied between power contact 705 and ground contact 710, timer chip 720 oscillates at 15 kHz, and switches transistor 715 on and off. This causes a load of 1 k ohms to switch in and out of the current path at 15 kHz. The purpose is to introduce a recognizable signature in the +15V current path.

As shown in FIG. 8A, the CACM's 900 micro-controller 910 monitors the voltage difference between SENSHI node 926 and SENSLO node 925. This voltage difference indicates the amount of +15V current flowing from power contact arm 105(*i*) to cart electrical contact, e.g., electrical contact 406(*i*) or 406(*ii*). In the initial idle state, the micro-controller 910 holds PWREN signal 9200 low so that field effect transistor 960 is off and +15V current must flow through 1 k ohms of resistance. In this state, the micro-controller 910 looks for current matching the 15 kHz profile generated by the CCCM 700. After this signature is consistently detected for some appropriate time period (e.g., 5 seconds), the micro-controller 910 drives PWREN signal 9200 high, thereby turning on field effect transistor 960, and providing enough current to charge battery 610 on the shopping cart 600.

While the battery 610 is charging, the 15 kHz signature is continuously monitored. If it is interrupted, the micro-controller 910 turns off the field effect transistor 960 by driving PWREN signal 9200 low. For example, should shopping cart 600 be moved so that the CCCM 700 loses contact with the CACM 900, the signature will be interrupted and logic turns off the charging current.

Additionally, if a short circuit falls across the +15V power contact arms 105(*i*) and the ground contact arms 105(*ii*); this same logic quickly (e.g., instantaneously or within a few hundredths of a second) turns off the charging current. This can be the case if, for example, the metal frame of shopping cart 600 contacts both +15V power contact arms 105(*i*) and ground contact arms 105(*ii*).

The following is an example of an interaction between several of the previously described components. In an embodiment, as shown in FIG. 6B, a charging contact assembly 405 is mounted on shopping cart 600. In this example, charging contact assembly's 405 electrical contacts 406 are apportioned into to three distinct groups, wherein each group is electrically connected in common, e.g., a first electrical contact 406(*i*) is attached to a first CCCM 700 and a second electrical contact 406(*ii*) is attached to a second CCCM 700. In such an embodiment, a third electrical contact 406(*iii*) is connected to the current return path of the first CCCM 700 and the second CCCM 700 (i.e., ground). In this example, first electrical contact 406(*i*) and second electrical contact 406(*ii*) are electrically connected to the shopping cart 600's battery 610 to supply an electrical current from their connection to/interaction with power contact arms 105(*i*) and the third electrical contact 406(*iii*) will be the ground connector. As noted, this example further comprises a multiple contact arms 105 assembly embodiment as described in FIG. 3B. In this embodiment, one CACM 900 is attached to each power contact arm 105(*i*), as shown in FIG. 9. In an embodiment, the spacing of the contact arms 105 in the assembly is such that: (i) the number of lower contact arms 105, i.e., ground contact arms 105(*ii*) of layers 3071 and 3072, contacting the third electrical contact 406(*iii*) is either 1 or 2; never zero (no dead spots); (ii) the number of upper contact arms 105, i.e., power contact arms 105(*i*) of layers 3061 and 3062, contacting the first electrical contact 406(*i*) and the second electrical contact 406(*ii*) is either 1 or 2; never zero (no dead spots); (iii) the number of upper contact arms 105, i.e., power contact arms 105(*i*) of layers 3061 and 3062, contacting the first electrical contact 406(*i*) is either 0 or 1, never 2; and (iv) the number of upper contact arms 105, i.e., power contact arms 105(*i*) of layers 3061 and 3062, contacting the second electrical contact 406(*ii*) is either 0 or 1, never 2. As such, there is never more than one CCCM 700 connected to each CACM 900. Likewise, there is never more than one CACM 900 connected to each CCCM 700. This example also comprises a +15V power supply 1001. Of further note, as shown in FIGS. 4B and 6B, by placing the +15V electrical contacts (i.e., electrical contacts 406(*i*) and 406(*ii*)) and ground contact (i.e., electrical contact 406(*iii*)) in such close proximity, the effective antenna loop size is minimized and spurious electromagnetic emissions are reduced. Thus, facilitating compliance with electromagnetic emissions limits.

FIG. 7B illustrates the interactions of the above example. As depicted in FIG. 7B, when +15V is applied between power contact 705 and ground contact 710, timer chip 720 oscillates at 15 kHz, and switches transistor 715 on and off. This causes a load of 1 k ohms to switch in and out of the current path at 15 kHz. The purpose is to introduce a recognizable signature in the +15V current path.

As shown in FIG. 8A, the CACM's 900 micro-controller 910 monitors the voltage difference between SENSHI node 926 and SENSLO node 925. This voltage difference indicates the amount of +15V current flowing from power contact arm 105(*i*) to cart electrical contact, e.g., electrical contact 406(*i*) or 406(*ii*). In the initial idle state, the micro-controller 910 holds PWREN signal 9200 low so that field effect transistor 960 is off and +15V current must flow through 1 k ohms of resistance. In this state, the micro-controller 910 looks for current matching the 15 kHz profile generated by the CCCM 700. After this signature is consistently detected for some appropriate time period (e.g., 5 seconds), the micro-controller 910 drives PWREN signal 9200 high, thereby turning on field effect transistor 960, and providing enough current to charge battery 610 on the shopping cart 600.

While the battery 610 is charging, the 15 kHz signature is continuously monitored. If it is interrupted, the micro-controller 910 turns off the field effect transistor 960 by driving PWREN signal 9200 low. For example, should shopping cart 600 be moved so that the CCCM 700 loses contact with the CACM 900, the signature will be interrupted and logic turns off the charging current.

Additionally, if a short circuit falls across the +15V power contact arms 105(*i*) and the ground contact arms 105(*ii*); this same logic quickly (e.g., instantaneously or within a few hundredths of a second) turns off the charging current. This can be the case if, for example, the metal frame of shopping cart 600 contacts both +15V power contact arms 105(*i*) and ground contact arms 105(*ii*).

In an embodiment, ground contact arms 105(*ii*) and ground electrical contact 406(*iii*)/ground charging contact 403 are positioned and allowed to interact differently than power contact arms 105(*i*) and electric power receiving electrical contacts 406(*i*), 406(*ii*)/a first or second associated portion of charging contact 402. For example, multiple ground contact arms 105(*ii*) are allowed to contact a ground electrical contact 406(*iii*)/charging contact 403 simultaneously, whereas multiple power contact arms 105(*i*) are not allowed to simultaneously contact a single electrical contact 406(*i*), 406(*ii*), a first associated portion of charging contact 402, or a second associated portion of charging contact 402. The above may be accomplished by using a first layer of contact arms 105 and a second layer of contact arms 105, wherein the contact arms 105 in each layer are spaced by X, wherein X equals the distance between corresponding portions of contact arms 105 in a layer, and wherein the first layer and the second layer are horizontally offset by half of the distance between the contact arms' 105 corresponding portions (e.g. X/2), and by requiring the electric power receiving electrical contacts 406(*i*), 406(*ii*)/an associated portion of charging contact 402 to be limited in horizontal length to prevent contact with two power contact arms 105(*i*) simultaneously (e.g. horizontal length less than X/2), and by requiring the ground electrical contact 406(*iii*)/ground charging contact 403 to have sufficient horizontal length to always contact at least one ground contact arm 105(*i*) (e.g. horizontal length at least >X).

In an embodiment, a pair of electrical contacts 406(*i*) and 406(*ii*), or a first associated portion of charging contact 402 and a second associated portion of charging contact 402, are arranged so that the pair's cumulative length is more than X/2, and so that one of the pair will contact power contact arm 105(*i*). All ground electrical contact 406(*iii*)/ground charging contact 403 are electrically connected to each other.

In an exemplary operation, a shopping cart 600 may be positioned, by a consumer or store employee, placing the shopping cart's 600 charging contact 400 or charging contact assembly 405 in contact with contact charging arms 105 (and associatively in contact with power source 1000) to facilitate recharging of said shopping cart's 600 battery 610 (or batteries). Contact between contact arms 105 and charging contact 400 or charging contact assembly 405 forms a flow path for electrical current between power source 1000 and the battery 610 such that the battery 610 may be recharged.

The disclosed contact charging system for vehicle-mounted batteries may be further described by the following enumerated embodiments:

1. A system for charging a vehicle-mounted battery comprising:
   a vehicle;
   a battery;
   a plurality of electrical contacts, wherein the plurality of electrical contacts is coupled to the vehicle and at least one of the plurality of electrical contacts is electrically connected to the battery;
   a plurality of electric power transfer components, wherein at least one of the plurality of electric power transfer components rotates about an axis, and wherein each of the plurality of electric power transfer components is configured to prevent undesired connections between the plurality of electric power transfer components and the vehicle; and
   a power source.
2. The system of 1, further comprising a current profile generating module, wherein the current profile generating module is operably connected to no more than one electrical contact.
3. The system of 1 or 2, further comprising a current flow monitoring module, wherein the current flow monitoring module is operably connected to no more than one electric power transfer component.
4. The system of 3, wherein the current profile generating module and the current flow monitoring module each determine whether valid electrical contact is made between system components.
5. The system of 3, wherein the electrical contact comprises:
   a frame; and
   a wire.
6. The system of 5, wherein the wire comprises: a first capped end comprising a restriction element to prevent the end from passing through the frame;
   a tensioning component, wherein the tensioning component is positioned between the restriction element and the frame; and
   a second capped end.
7. The system of 6, wherein the second capped end comprises a screw-type area which is configured to interact with a screw-type receiving portion of the frame for affecting the tensioning component.
8. The system of 6 or 7, wherein the frame comprises segments separated by a distance, wherein the distance may be altered for affecting the tensioning component.
9. The system of 6, 7, or 8, wherein the tensioning component is selected from the group consisting of a spring, a bushing, a band, and a combination thereof.
10. The system of 6, 7, 8, or 9, further comprising a plurality of wires.
11. The system of 1, 2, 3, 4, 5, 6, 7, 8, 9, or 10, wherein a first electrical contact and a second electrical contact are positioned in as near proximity to each other as operationally possible, thus resulting in minimal effective antenna loop size.
12. The system of 1, 2, 3, 4, 5, 6, 7, 8, 9, 10 or 11, wherein each of the plurality of electric power transfer components comprise:
   a contact arm, wherein the contact arm is connected to a tensioning component.
13. The system of 12, wherein the tensioning component comprises a helical compression spring, a coiled extension spring, an elastic band, a bushing, a hydraulic piston device, a spring-loaded scissors linkage, a spring-loaded parallelogram linkage, an archery-bow-type component, or a combination thereof.
14. The system of 12 or 13, wherein the contact arm comprises a curved charging portion that consistently presents about a 45 degree attack angle.

15. The system of 1, 2, 3, 4, 5, 6, 7, 8, 9, 10, 11, 12, 13, or 14, wherein the plurality of electric power transfer components are arranged in plurality of layers.
16. The system of 15, wherein a first layer transfers electric power while contacting a first electrical contact and wherein a second layer functions as a ground while contacting a second electrical contact.
17. The system of 16, further comprising a third layer which transfers electric power while contacting a third electrical contact and a fourth layer which functions as a ground while contacting the second electrical contact, wherein the first layer contacts the.
18. The system of 16 or 17, wherein no more than one of the plurality of electric power transfer components transfers electric power to each electric contact, wherein at least one of the plurality of electric power transfer components transfers electric power to at least one electrical contact, and wherein at least one of the plurality of electric power transfer components functions as a ground.
19. A system for charging a vehicle-mounted battery comprising:
a vehicle;
a battery;
a plurality of electrical contacts, wherein the plurality of electrical contacts is coupled to the vehicle and at least one of the plurality of electrical contacts is electrically connected to the battery;
a plurality of electric power transfer components, wherein at least one of the plurality of electric is tensioned so that at least one of the plurality of electric power transfer components maintains contact with at least one of the plurality of electrical contacts without utilizing a guide mechanism for the vehicle; and a power source.
20. The system of 19, further comprising a current profile generating module, wherein the current profile generating module is operably connected to no more than one electrical contact.
21. The system of 19 or 20, further comprising a current flow monitoring module, wherein the current flow monitoring module is operably connected to no more than one electric power transfer component.
22. The system of 21, wherein the current profile generating module and the current flow monitoring module each determine whether valid electrical contact is made between system components.
23. The system of 21, wherein the electrical contact comprises:
a frame; and
a wire.
24. The system of 23, wherein the wire comprises: a first capped end comprising a restriction element to prevent the end from passing through the frame;
a tensioning component, wherein the tensioning component is positioned between the restriction element and the frame; and
a second capped end.
25. The system of 24, wherein the second capped end comprises a screw-type area which is configured to interact with a screw-type receiving portion of the frame for affecting the tensioning component.
26. The system of 24 or 25, wherein the frame comprises segments separated by a distance, wherein the distance may be altered for affecting the tensioning component.
27. The system of 24, 25, or 26, wherein the tensioning component is selected from the group consisting of a spring, a bushing, a band, and a combination thereof.
28. The system of 24, 25, 26, or 27, further comprising a plurality of wires.
29. The system of 19, 20, 21, 22, 23, 24, 25, 26, 27, or 28, wherein a first electrical contact and a second electrical contact are positioned in as near proximity to each other as operationally possible, thus resulting in minimal effective antenna loop size.
30. The system of 19, 20, 21, 22, 23, 24, 25, 26, 27, 28, or 29, wherein each of the plurality of electric power transfer components comprise:
a contact arm, wherein the contact arm is connected to a tensioning component.
31. The system of 30, wherein the tensioning component comprises a helical compression spring, a coiled extension spring, an elastic band, a bushing, a hydraulic piston device, a spring-loaded scissors linkage, a spring-loaded parallelogram linkage, an archery-bow-type component, or a combination thereof.
32. The system of 30 or 31, wherein the contact arm comprises a curved charging portion that consistently presents about a 45 degree attack angle.
33. The system of 18, 19, 20, 21, 22, 23, 24, 25, 26, 27, 28, 29, 30, 31, or 32, wherein the plurality of electric power transfer components are arranged in plurality of layers.
34. The system of 33, wherein a first layer transfers electric power while contacting a first electrical contact and wherein a second layer functions as a ground while contacting a second electrical contact.
35. The system of 34, further comprising a third layer which transfers electric power while contacting a third electrical contact and a fourth layer which functions as a ground while contacting the second electrical contact, wherein the first layer contacts the.
36. The system of 33 or 34, wherein no more than one of the plurality of electric power transfer components transfers electric power to each electric contact, wherein at least one of the plurality of electric power transfer components transfers electric power to at least one electrical contact, and wherein at least one of the plurality of electric power transfer components functions as a ground.
37. A system for charging a vehicle-mounted battery comprising:
a vehicle;
a battery;
a plurality of electrical contacts, wherein the plurality of electrical contacts is coupled to the vehicle and at least one of the plurality of electrical contacts is electrically connected to the battery;
a plurality of electric power transfer components, wherein at least one of the plurality of electric power transfer components is mounted to a plurality of mechanical constraints, wherein at least one of the plurality of mechanical constraints is associated with a tensioning component, wherein the tensioning component is configured to exert force on the least one of the plurality of electric power transfer components to facilitate maintaining contact between the at least one of the plurality of electric power transfer components and the vehicle, and wherein each of the plurality of electric power transfer components is configured to prevent undesired connections between the plurality of electric power transfer components and the vehicle; and a power source.
38. The system of 37, further comprising a current profile generating module, wherein the current profile generating module is operably connected to no more than one electrical contact.

39. The system of 37 or 38, further comprising a current flow monitoring module, wherein the current flow monitoring module is operably connected to no more than one electric power transfer component.
40. The system of 37, wherein the current profile generating module and the current flow monitoring module each determine whether valid electrical contact is made between system components.
41. The system of 40, wherein the electrical contact comprises:
a frame; and
a wire.
42. The system of 41, wherein the wire comprises:
a first capped end comprising a restriction element to prevent the end from passing through the frame;
a tensioning component, wherein the tensioning component is positioned between the restriction element and the frame; and
a second capped end.
43. The system of 42, wherein the second capped end comprises a screw-type area which is configured to interact with a screw-type receiving portion of the frame for affecting the tensioning component.
44. The system of 42 or 43, wherein the frame comprises segments separated by a distance, wherein the distance may be altered for affecting the tensioning component.
45. The system of 42, 43, or 44, wherein the tensioning component is selected from the group consisting of a spring, a bushing, a band, and a combination thereof.
46. The system of 42, 43, 44, or 45, further comprising a plurality of wires.
47. The system of 35, 36, 37, 38, 39, 40, 41, 42, 43, or 44, wherein a first electrical contact and a second electrical contact are positioned in as near proximity to each other as operationally possible, thus resulting in minimal effective antenna loop size.
48. The system of 37, 38, 39, 40, 41, 42, 43, 44, 45, 46, or 47, wherein each of the plurality of electric power transfer components comprise:
a contact arm, wherein the contact arm is connected to a tensioning component.
49. The system of 48, wherein the contact arm comprises a curved charging portion that consistently presents about a 45 degree attack angle.
50. The system of 37, 38, 39, 40, 41, 42, 43, 44, 45, 46, 47, or 48, wherein the plurality of electric power transfer components are arranged in plurality of layers.
51. The system of 50, wherein a first layer transfers electric power while contacting a first electrical contact and wherein a second layer functions as a ground while contacting a second electrical contact.
52. The system of 51, further comprising a third layer which transfers electric power while contacting a third electrical contact and a fourth layer which functions as a ground while contacting the second electrical contact, wherein the first layer contacts the.
53. The system of 51 or 52, wherein no more than one of the plurality of electric power transfer components transfers electric power to each electric contact, wherein at least one of the plurality of electric power transfer components transfers electric power to at least one electrical contact, and wherein at least one of the plurality of electric power transfer components functions as a ground.
54. A contact for receiving an electric power transfer, wherein the contact comprises a plurality of contacting portions configured to receive electrical power transfer from a plurality of electric power transfer components.
55. The contact of 54, wherein the contact comprises a charging contact.
56. The contact of 55, wherein the contact comprises a frame and a wire.
57. The contact of 56, wherein the wire comprises:
a first capped end comprising a restriction element to prevent the end from passing through the frame;
a tensioning component, wherein the tensioning component is positioned between the restriction element and the frame; and
a second capped end.
58. The contact of 57, wherein the second capped end comprises a screw-type area which is configured to interact with a screw-type receiving portion of the frame for affecting the tensioning component.
59. The contact of 57 or 58, wherein the frame comprises segments separated by a distance, wherein the distance may be altered for affecting the tensioning component.
60. The contact of 57, 58, or 59, wherein the tensioning component is selected from the group consisting of a spring, a bushing, a band, and a combination thereof.
61. The contact of 57, 58, 59, or 60, further comprising a plurality of wires.
62. The electrical contact of 54, wherein the electrical contact comprises a charging contact assembly.
63. The electrical contact of 62, wherein the electrical contact comprises a housing.
64. The electrical contact of 54, 55, 56, 57, 58, 59, 60, 61, 62, or 63, wherein a first electrical contact portion and a second electrical contact portion are positioned in as near proximity to each other as operationally possible, thus resulting in minimal effective antenna loop size.
65. A contact component for transferring electric power, wherein the contact component rotates about an axis, and wherein the contact component is configured to prevent undesired connections between the component and a vehicle which it contacts for electric power transfer.
66. The contact component of 65, further comprising a current flow monitoring module, wherein the current flow monitoring module is operably connected to no more than one contact component.
67. The contact component of 65 or 66, wherein the contact component comprises a contact arm.
68. The contact arm of 67, wherein the contact arm comprises a substantially non-curved portion and a substantially curved portion.
69. The contact arm of 67, wherein the contact arm does not comprise a substantially non-curved portion.
70. The contact component of 65, 66, 67, 68, or 69, wherein the contact component is connected to a tensioning component.
71. The contact component of 70, wherein the tensioning component comprises a helical compression spring, a coiled extension spring, an elastic band, a bushing, a hydraulic piston device, a spring-loaded scissors linkage, a spring-loaded parallelogram linkage, an archery-bow-type component, or a combination thereof.
72. The contact component of 65, 66, 67, 68, 69, 70, or 71, wherein the contact component comprises a curved charging portion that consistently presents about a 45 degree attack angle.
73. The contact component of 65, 66, 67, 68, 69, 70, 71, or 72, wherein the contact component is configured for layered association with a plurality of contact components.
74. A contact component for transferring electric power, wherein the contact component is mounted to a plurality of mechanical constraints, wherein at least one of the plurality of mechanical constraints is associated with a tensioning component, wherein the tensioning component is configured to exert force on the contact component to facilitate maintaining contact between the contact component and a vehicle which it contacts for electric power transfer.

75. The contact component of 74, further comprising a current flow monitoring module, wherein the current flow monitoring module is operably connected to no more than one contact component.

76. The contact component of 74 or 75, wherein the contact component comprises a contact arm.

77. The contact arm of 76, wherein the contact arm comprises a substantially non-curved portion and a substantially curved portion.

78. The contact arm of 76, wherein the contact arm does not comprise a substantially non-curved portion.

79. The contact component of 74, 75, 76, 77, or 78, wherein the tensioning component comprises a helical compression spring, a coiled extension spring, an elastic band, a bushing, a hydraulic piston device, a spring-loaded scissors linkage, a spring-loaded parallelogram linkage, an archery-bow-type component, or a combination thereof.

80. The contact component of 74, 75, 76, 77, 78, or 79, wherein the contact component comprises a curved charging portion that consistently presents about a 45 degree attack angle.

81. The contact component of 74, 75, 76, 77, 78, 79, or 80, wherein the contact component is configured for layered association with a plurality of contact components.

82. A method of charging a vehicle mounted battery comprising:

providing a vehicle, wherein the vehicle comprises a battery;

providing a plurality of electrical contacts, wherein the plurality of electrical contacts is affixed to the vehicle and at least one of the plurality of electrical contacts is electrically connected to the battery;

providing a plurality of electric power transfer components, wherein at least one of the plurality of electric power transfer components rotates about an axis and is electrically connected to a power source;

allowing for the at least one electric power transfer component and the at least one of the plurality of electrical contacts which is electrically connected to the battery to come into contact, wherein the plurality of electric power transfer components is configured to prevent undesired connections between the plurality of electric power transfer components and the vehicle.

83. Use of a system, electrical contact, or contact component of any preceding enumerated embodiment for charging a vehicle-mounted battery.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. The various embodiments and components thereof disclosed herein may be used singularly or in combination with any other embodiment disclosed herein. Throughout the figures, like numbers correspond to like parts.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A system for charging a vehicle-mounted battery comprising:
a vehicle;
a power transfer station;
a battery;
a plurality of electrical contacts, wherein the plurality of electrical contacts is coupled to the vehicle and at least one of the plurality of electrical contacts is electrically connected to the battery;
a plurality of electric power transfer components coupled to the power transfer station, wherein at least one of the plurality of electric power transfer components rotates about an axis, and wherein each of the plurality of electric power transfer components is configured to prevent undesired connections between the plurality of electric power transfer components and the vehicle;
a plurality of current flow monitoring modules, wherein each of the plurality of current flow monitoring modules comprises a portion of the power transfer station; and
a current profile generating module, wherein the current profile generating module communicates digital information to each of the plurality of current flow monitoring modules via at least one of the plurality of electrical contacts and at least one of the plurality of electric power transfer components; and
a power source.

2. The system of claim 1, wherein the current profile generating module is operably connected to no more than one electrical contact.

3. The system of claim 1, wherein each of the plurality of current flow monitoring modules is operably connected to no more than one electric power transfer component.

4. The system of claim 2, wherein each of the plurality of current flow monitoring modules is operably connected to no more than one electric power transfer component.

5. The system of claim 3, wherein the current profile generating module and the plurality of current flow monitoring modules each determine whether valid electrical contact is made between system components.

6. The system of claim 4, wherein the current profile generating module and the plurality of current flow monitoring modules each determine whether valid electrical contact is made between system components.

7. The system of claim 3, wherein the electrical contact comprises:
   a frame; and
   a wire.

8. The system of claim 4, wherein the electrical contact comprises:
   a frame; and
   a wire.

9. The system of claim 7, wherein the wire comprises:
   a first capped end comprising a restriction element to prevent the end from passing through the frame;
   a tensioning component, wherein the tensioning component is positioned between the restriction element and the frame; and
   a second capped end.

10. The system of claim 8, wherein the wire comprises:
    a first capped end comprising a restriction element to prevent the end from passing through the frame;
    a tensioning component, wherein the tensioning component is positioned between the restriction element and the frame; and
    a second capped end.

11. The system of claim 1, wherein each of the plurality of electric power transfer components comprise:
    a contact arm, wherein the contact arm is connected to a tensioning component.

12. The system of claim 1, wherein the plurality of electric power transfer components are arranged in plurality of layers.

13. The system of claim 12, wherein a first layer transfers electric power while contacting a first electrical contact and wherein a second layer functions as a ground while contacting a second electrical contact.

14. The system of claim 13, further comprising a third layer which transfers electric power while contacting a third electrical contact and a fourth layer which functions as a ground while contacting the second electrical contact.

15. The system of claim 14, wherein no more than one of the plurality of electric power transfer components transfers electric power to each electric contact, wherein at least one of the plurality of electric power transfer components transfers electric power to at least one electrical contact, and wherein at least one of the plurality of electric power transfer components functions as a ground.

16. A system for charging a vehicle-mounted battery comprising:
    a vehicle;
    a power transfer station;
    a battery;
    a plurality of electrical contacts, wherein the plurality of electrical contacts is coupled to the vehicle and at least one of the plurality of electrical contacts is electrically connected to the battery;
    a plurality of electric power transfer components coupled to the power transfer station, wherein at least one of the plurality of electric power transfer components is tensioned so that at least one of the plurality of electric power transfer components maintains contact with at least one of the plurality of electrical contacts without utilizing a guide mechanism for the vehicle;
    a plurality of current flow monitoring modules, wherein each of the plurality of current flow monitoring modules comprises a portion of the power transfer station; and
    a current profile generating module, wherein the current profile generating module communicates digital information to each of the plurality of current flow monitoring modules via at least one of the plurality of electrical contacts and at least one of the plurality of electric power transfer components; and
    a power source.

17. The system of claim 16, wherein the current profile generating module is operably connected to no more than one electrical contact.

18. The system of claim 17, wherein each of the plurality of current flow monitoring modules is operably connected to no more than one electric power transfer component.

19. The system of claim 18, wherein the current profile generating module and the plurality of current flow monitoring modules each determine whether valid electrical contact is made between system components.

20. A system for charging a vehicle-mounted battery comprising:
    a vehicle;
    a power transfer station;
    a battery;
    a plurality of electrical contacts, wherein the plurality of electrical contacts is coupled to the vehicle and at least one of the plurality of electrical contacts is electrically connected to the battery;
    a plurality of electric power transfer components coupled to the power transfer station, wherein at least one of the plurality of electric power transfer components is mounted to a plurality of mechanical constraints, wherein at least one of the plurality of mechanical constraints is associated with a tensioning component, wherein the tensioning component is configured to exert force on the least one of the plurality of electric power transfer components to facilitate maintaining contact between the at least one of the plurality of electric power transfer components and the vehicle, and wherein each of the plurality of electric power transfer components is configured to prevent undesired connections between the plurality of electric power transfer components and the vehicle;
    a plurality of current flow monitoring modules, wherein each of the plurality of current flow monitoring modules comprises a portion of the power transfer station; and
    a current profile generating module, wherein the current profile generating module communicates digital information to each of the plurality of current flow monitoring modules via at least one of the plurality of electrical contacts and at least one of the plurality of electric power transfer components; and
    a power source.

* * * * *